US012574132B2

(12) United States Patent　　(10) Patent No.:　US 12,574,132 B2
Lee et al.　　(45) Date of Patent:　Mar. 10, 2026

(54) LEARNING-BASED SIGNAL RECEIVING METHOD AND DEVICE

(71) Applicant: LG ELECTRONICS INC., Seoul (KR)

(72) Inventors: Jongku Lee, Seoul (KR); Ilhwan Kim, Seoul (KR); Sungryong Hong, Seoul (KR); Ikjoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 671 days.

(21) Appl. No.: 17/797,585

(22) PCT Filed: Apr. 7, 2020

(86) PCT No.: PCT/KR2020/004680

§ 371 (c)(1),
(2) Date: Aug. 4, 2022

(87) PCT Pub. No.: WO2021/206189

PCT Pub. Date: Oct. 14, 2021

(65) Prior Publication Data

US 2025/0219748 A1　　Jul. 3, 2025

(51) Int. Cl.
| *H04B 17/391* | (2015.01) |
| *G06N 20/00* | (2019.01) |
| *H04W 8/24* | (2009.01) |
| *H04W 24/06* | (2009.01) |
| *H04W 48/14* | (2009.01) |

(52) U.S. Cl.
CPC ......... *H04B 17/3912* (2015.01); *G06N 20/00* (2019.01); *H04W 8/24* (2013.01); *H04W 24/06* (2013.01); *H04W 48/14* (2013.01)

(58) Field of Classification Search
CPC ..... H04B 17/3912; G06N 20/00; H04W 8/24; H04W 24/06; H04W 48/14
See application file for complete search history.

(56) References Cited

U.S. PATENT DOCUMENTS

| 10,165,105 | B1 * | 12/2018 | Do | ........................ H04L 51/214 |
| 11,568,271 | B1 * | 1/2023 | Bychkovsky | ............. G06F 8/65 |
| 2014/0211874 | A1 | 7/2014 | Xia et al. | |
| 2019/0132741 | A1 * | 5/2019 | Stone | ........................ G06F 3/02 |
| 2019/0274108 | A1 * | 9/2019 | O'Shea | .............. H04B 17/3912 |
| 2020/0018815 | A1 | 1/2020 | O'Shea et al. | |

(Continued)

FOREIGN PATENT DOCUMENTS

| WO | 2018014945 | 1/2018 |
| WO | 2018234084 | 12/2018 |
| WO | 2019060195 | 3/2019 |

OTHER PUBLICATIONS

PCT International Application No. PCT/KR2020/004680, International Search Report dated Dec. 21, 2020, 4 pages.

*Primary Examiner* — Charles N Appiah
*Assistant Examiner* — Nicole M Louis-Fils
(74) *Attorney, Agent, or Firm* — LEE, HONG, DEGERMAN, KANG & WAIMEY

(57) ABSTRACT

The present disclosure proposes a method and procedure for performing additional learning using data secured in an actual environment in a basic receiver model optimized for a representative environment and a method of operating a plurality of customized receiver models secured through this and the basic receiver model together.

13 Claims, 43 Drawing Sheets

(56)         References Cited

U.S. PATENT DOCUMENTS

| | | | | |
|---|---|---|---|---|
| 2021/0084578 A1* | 3/2021 | Ingale | .................. | H04W 72/23 |
| 2021/0126737 A1* | 4/2021 | Zhang | .................. | H04L 5/0094 |
| 2022/0159493 A1* | 5/2022 | Geng | .................. | H04J 11/0073 |

* cited by examiner

FIG. 37

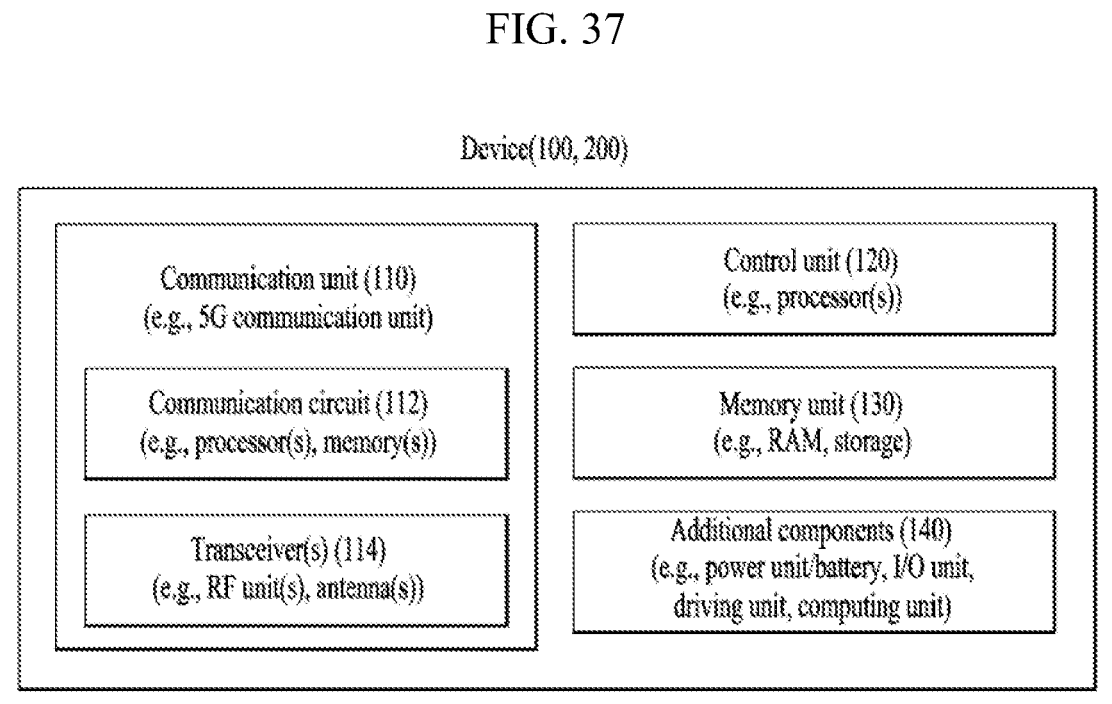

Device(100, 200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 40

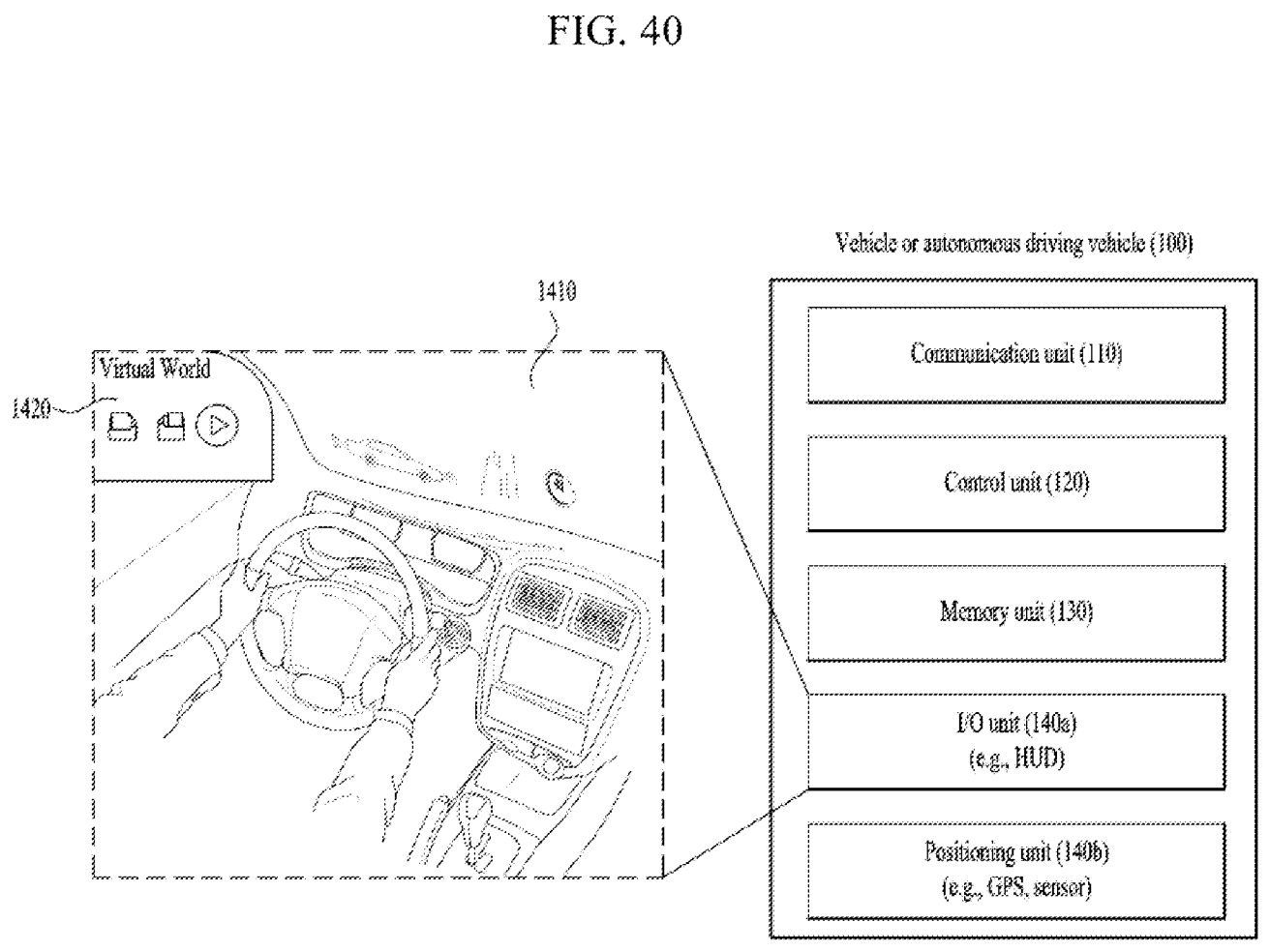

Vehicle or autonomous driving vehicle (100)

Communication unit (110)

Control unit (120)

Memory unit (130)

I/O unit (140a)
(e.g., HUD)

Positioning unit (140b)
(e.g., GPS, sensor)

1410

Virtual World

1420

LEARNING-BASED SIGNAL RECEIVING METHOD AND DEVICE

CROSS-REFERENCE TO RELATED APPLICATIONS

This application is the National Stage filing under 35 U.S.C. 371 of International Application No. PCT/KR2020/004680, filed on Apr. 7, 2020, the contents of which are all incorporated by reference herein in its entirety.

TECHNICAL FIELD

The present disclosure relates to wireless communication.

BACKGROUND ART

As more and more communication devices require greater communication capacity, there is a need for improved mobile broadband communication compared to a conventional radio access technology (RAT). In addition, massive MTC (massive machine type communications), which provides various services anytime, anywhere by connecting multiple devices and things, is also one of the major issues to be considered in next-generation communication. In addition, a communication system design in consideration of a service/terminal sensitive to reliability and latency is being discussed. The introduction of a next-generation wireless access technology in consideration of such expanded mobile broadband communication, massive MTC, and URLLC (Ultra-Reliable and Low Latency Communication) is being discussed, and in this disclosure, for convenience, the technology is called new RAT or NR.

Communication systems based on machine learning, including deep learning, are attracting attention as a key technology for next-generation communication systems because they have the advantage of being easy to customize and optimize, respond to environmental changes, and evolve through learning compared to existing communication systems. However, it is difficult to fully utilize these advantages only with simulation or data from some representative environments without data from the actual environment.

DISCLOSURE

Technical Problem

The present disclosure proposes a method of securing an improved receiver model through additional learning using learning data acquired in an actual environment as a wireless communication receiver model based on machine leaning including deep learning and improving overall performing by selecting and using a receiver model according to a use environment. In addition, a method and procedure between a user equipment (UE) and a base station for securing learning data in an actual environment will be described.

Advantageous Effects

According to the present specification, a receiver model optimized for an actual environment may be efficiently secured through additional learning in the actual environment based on a basic receiver model based on machine learning designed in consideration of all use environments, optimization for the actual environment may be accomplished without risk of performance degradation, by using an additionally trained receiver in an environment in which learning data is acquired and using a basic receiver mode in the other environments, and (semi-)supervised learning data reflecting not only a channel but also hardware may be secured. Therefore, it is possible to improve wireless communication reception performance in a user's main actual environment, to improve the quality of service, such as latency, battery consumption, transmission/reception speed, etc. and to increase overall communication network capacity.

Effects that can be obtained through specific examples of the present specification are not limited to the effects listed above. For example, various technical effects that a person having ordinary skill in the related art can understand or derive from the present specification may be present. Accordingly, the specific effects of the present specification are not limited to those explicitly described herein, and may include various effects that can be understood or derived from the technical characteristics of the present specification.

DESCRIPTION OF DRAWINGS

FIG. 37 shows another example of a wireless device, in accordance with an embodiment of the present disclosure.

FIG. 40 shows a vehicle, in accordance with an embodiment of the present disclosure.

MODE FOR INVENTION

In various embodiments of the present disclosure, "A or B (A or B)" may mean "only A", "only B" or "both A and B". In other words, in the present disclosure, "A or B (A or B)" may be interpreted as "A and/or B (A and/or B)". For example, "A, B or C(A, B or C)" herein means "only A", "only B", "only C", or "any and any combination of A, B and C (any combination of A, B and C)".

A slash (/) or a comma (comma) used herein may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B" or "both A and B". In addition, in the present disclosure, the expression "at least one of A or B" or "at least one of A and/or B" means "at least one It can be interpreted the same as "at least one of A and B".

Also, as used herein, "at least one of A, B and C" means "only A", "only B", "only C", or "A, B and C" Any combination of A, B and C". Also, "at least one of A, B or C" or "at least one of A, B and/or C" means may mean "at least one of A, B and C".

In addition, parentheses used herein may mean "for example". Specifically, when displayed as "control information (PDCCH)", "PDCCH" may be proposed as an example of "control information". In other words, "control information" in the present specification is not limited to "PDCCH", and "PDDCH" may be proposed as an example of "control information". Also, even when displayed as "control information (i.e., PDCCH)", "PDCCH" may be proposed as an example of "control information".

In the present disclosure, technical features that are individually described within one drawing may be implemented individually or simultaneously.

Figure 1:
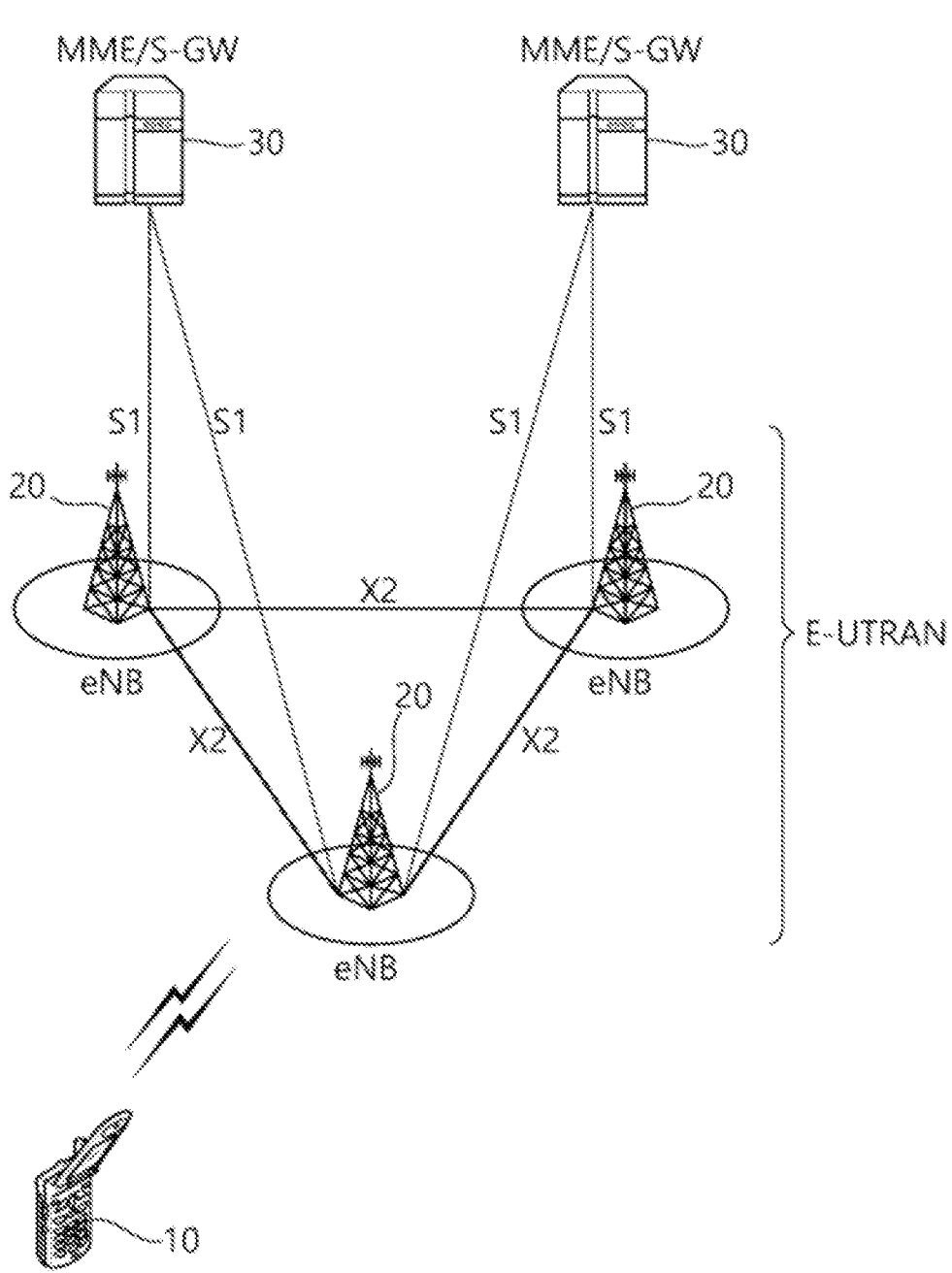
FIG. 1 shows a structure of an LTE system, in accordance with an embodiment of the present disclosure.

FIG. 1 shows a structure of a communication system, in accordance with an embodiment of the present disclosure. This may also be referred to as an Evolved-UMTS Terrestrial Radio Access Network (E-UTRAN), or a Long Term Evolution (LTE)/LTE-A system.

The E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet DataNetwork-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
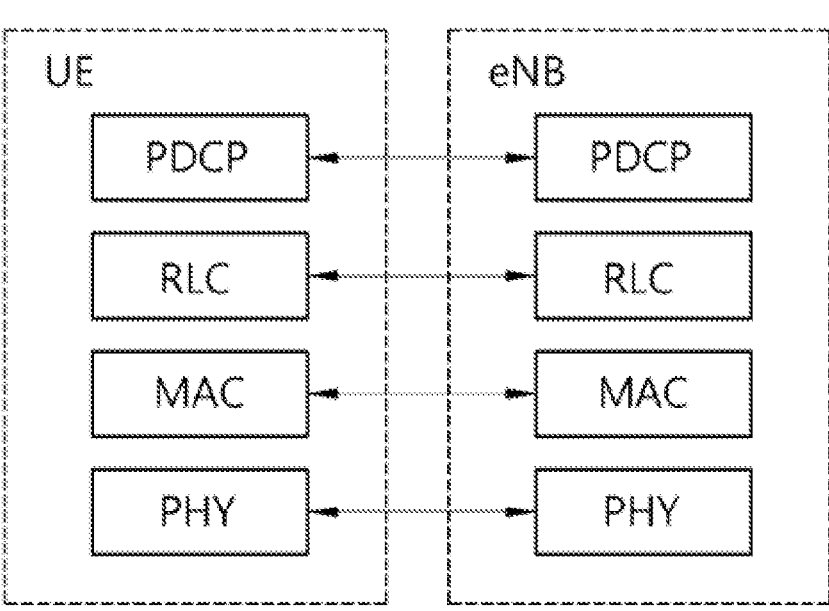
FIG. 2 shows a radio protocol architecture of a user plane, in accordance with an embodiment of the present disclosure.
Figure 3:
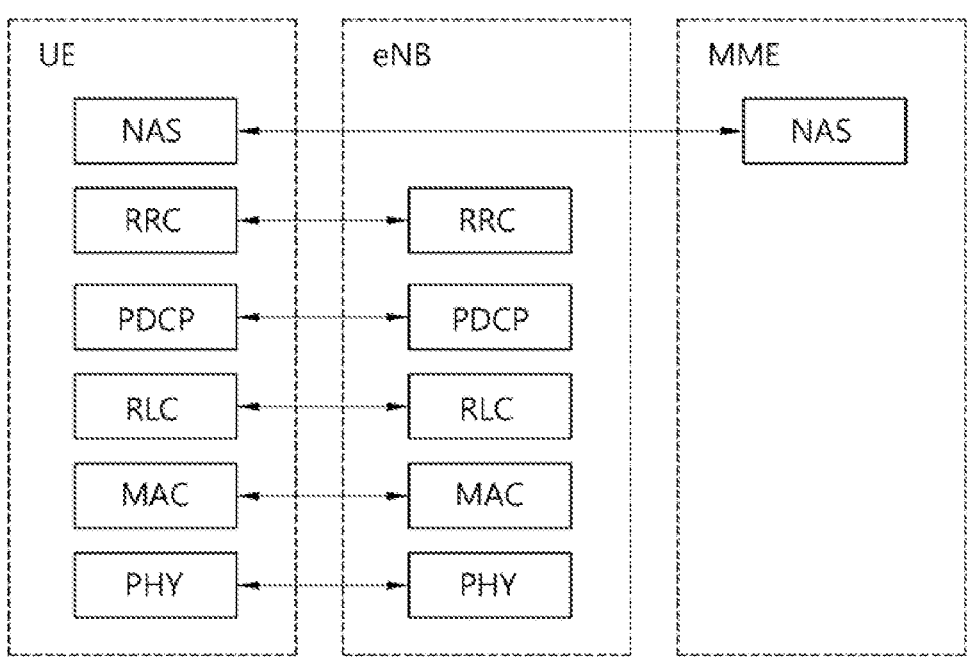
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Hereinafter, a new radio access technology (new RAT, NR) will be described.

As more and more communication devices require greater communication capacity, there is a need for improved mobile broadband communication compared to a conventional radio access technology (RAT). In addition, massive MTC (massive machine type communications), which provides various services anytime, anywhere by connecting multiple devices and things, is also one of the major issues to be considered in next-generation communication. In addition, a communication system design in consideration of a service/terminal sensitive to reliability and latency is being discussed. The introduction of a next-generation wireless access technology in consideration of such expanded mobile broadband communication, massive MTC, and URLLC (Ultra-Reliable and Low Latency Communication) is being discussed, and in this disclosure, for convenience, the technology is called new RAT or NR.

Figure 4:
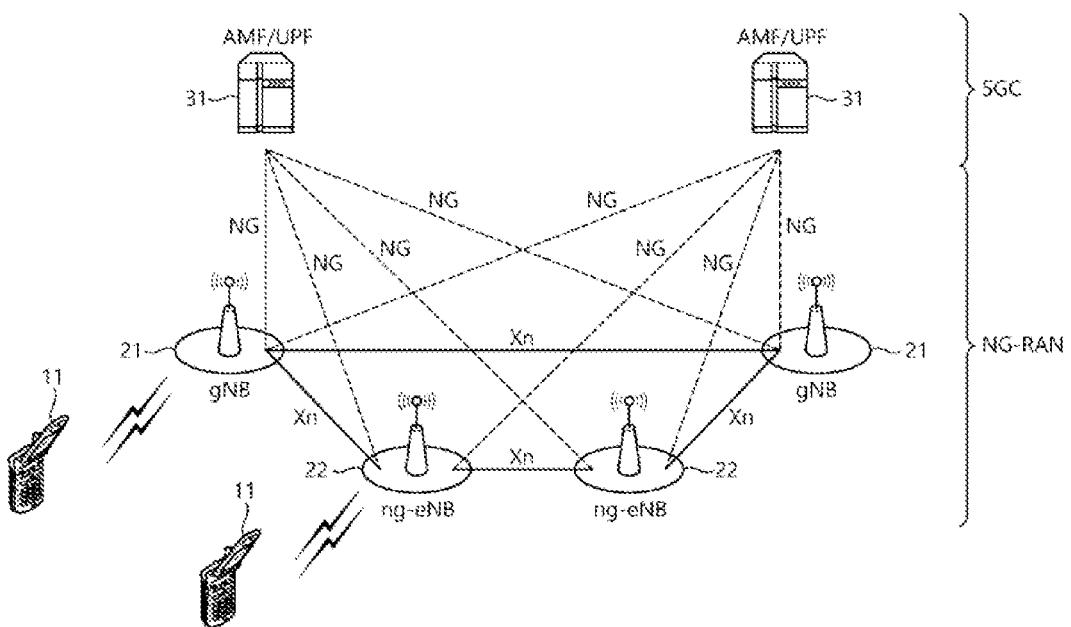
FIG. 4 shows a structure of an NR system, in accordance with an embodiment of the present disclosure.

FIG. 4 discloses another example of a wireless communication system to which the technical features of the present disclosure can be applied.

Specifically, FIG. 4 disclose a system architecture based on a 5G new radio access technology (NR) system. An entity used in a 5G NR system (hereinafter simply referred to as "NR") may absorb some or all functions of an entity (e.g., eNB, MME, S-GW) introduced in FIG. 1. An entity used in the NR system may be identified with the name "NG" to distinguish it from LTE.

Referring to FIG. 4, a Next Generation—Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

5GC includes an access and mobility management function (AMF), a user plane function (UPF), and a session management function (SMF). AMF hosts functions such as NAS security, idle state mobility handling, and more. The AMF is an entity that includes the functions of the conventional MME. UPF hosts functions such as mobility anchoring and PDU (protocol data unit) processing. The UPF is an entity that includes the functions of the conventional S-GW. SMF hosts functions such as UE IP address assignment and PDU session control.

gNB and ng-eNB are interconnected via Xn interface. gNB and ng-eNB are also connected to 5GC via NG interface. More specifically, it is connected to the AMF via the NG-C interface and to the UPF via the NG-U interface.

Figure 5:
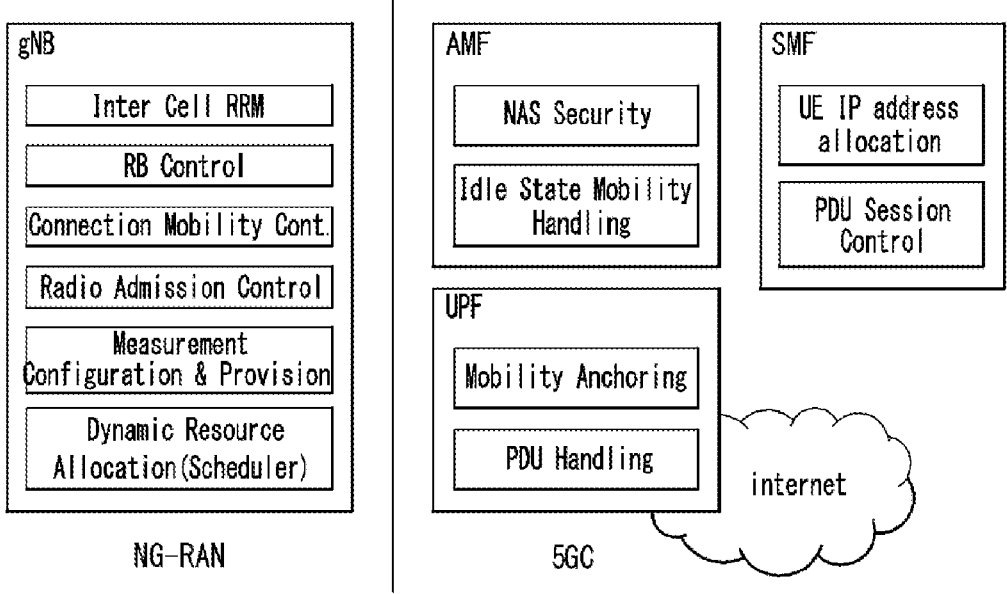
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
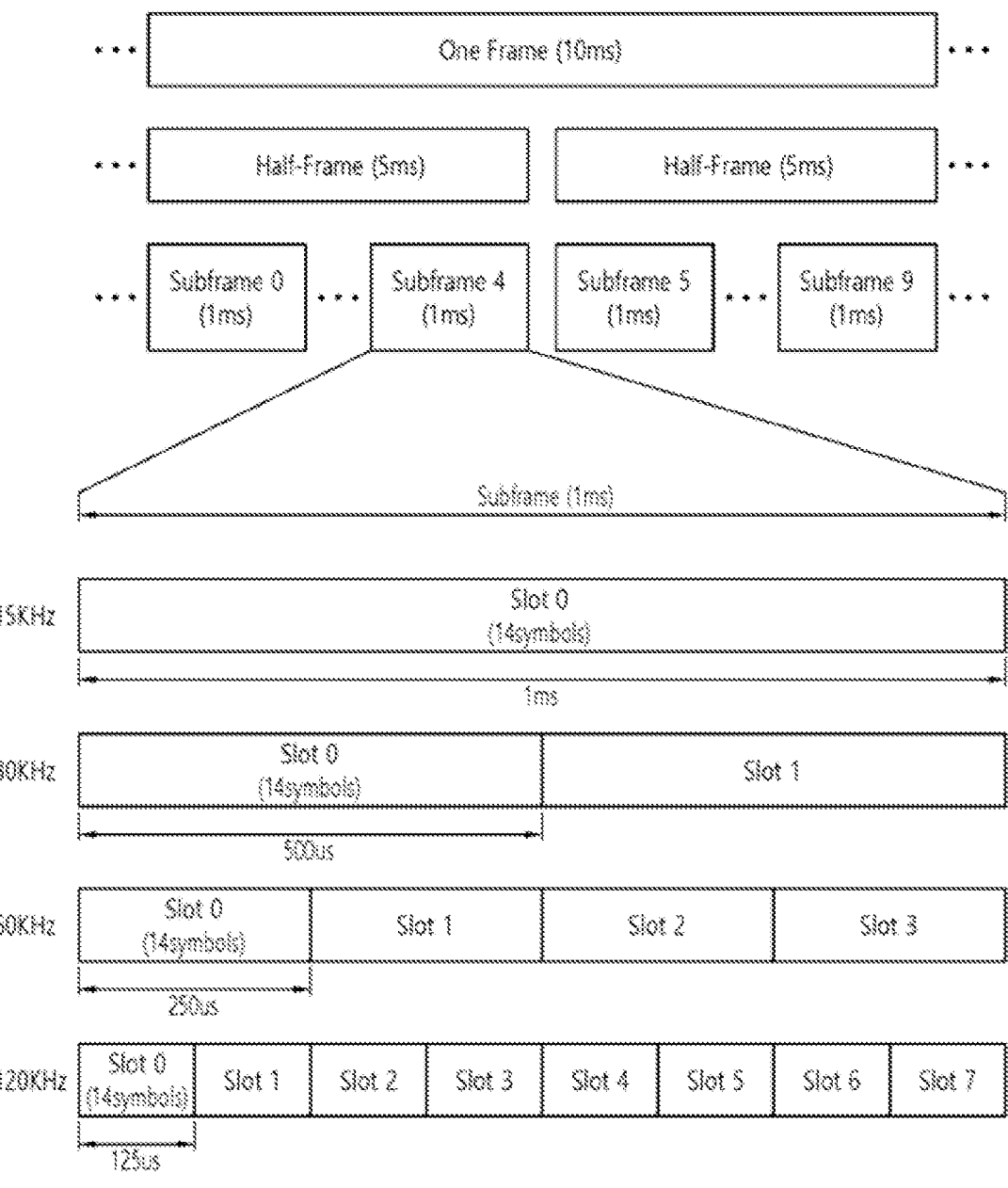
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, a frame may be configured with 10 millisecond, and may include 10 1-ms subframes.

In the NR, a radio frame may be used for performing uplink and downlink transmission. A radio frame has a length of 10 ms and may be defined to be configured of two 5-ms half-frames (HFs). A half-frame may include five 1-ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP). In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In the subframe, one or a plurality of slots may be included according to a subcarrier spacing (SCS).

Table 1 below shows a subcarrier spacing configuration μ.

TABLE 1

| μ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number $N^{frame,\mu}_{slot}$ of slots in a frame, the number $N^{subframe,\mu}_{slot}$ of slots in a subframe, the number $N^{slot}_{symb}$ of symbols in a slot, etc., according to a subcarrier spacing configuration μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 shows the number of symbols per slot, the number of slots per frame and the number of slots per subframe (SF) when the extended CP is used.

TABLE 3

| scs $(15 \cdot 2^\mu)$ | $N^{slot}_{symb}$ | $N^{frame,\mu}_{slot}$ | $N^{subframe,\mu}_{slot}$ |
|---|---|---|---|
| 60 kHz (μ = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
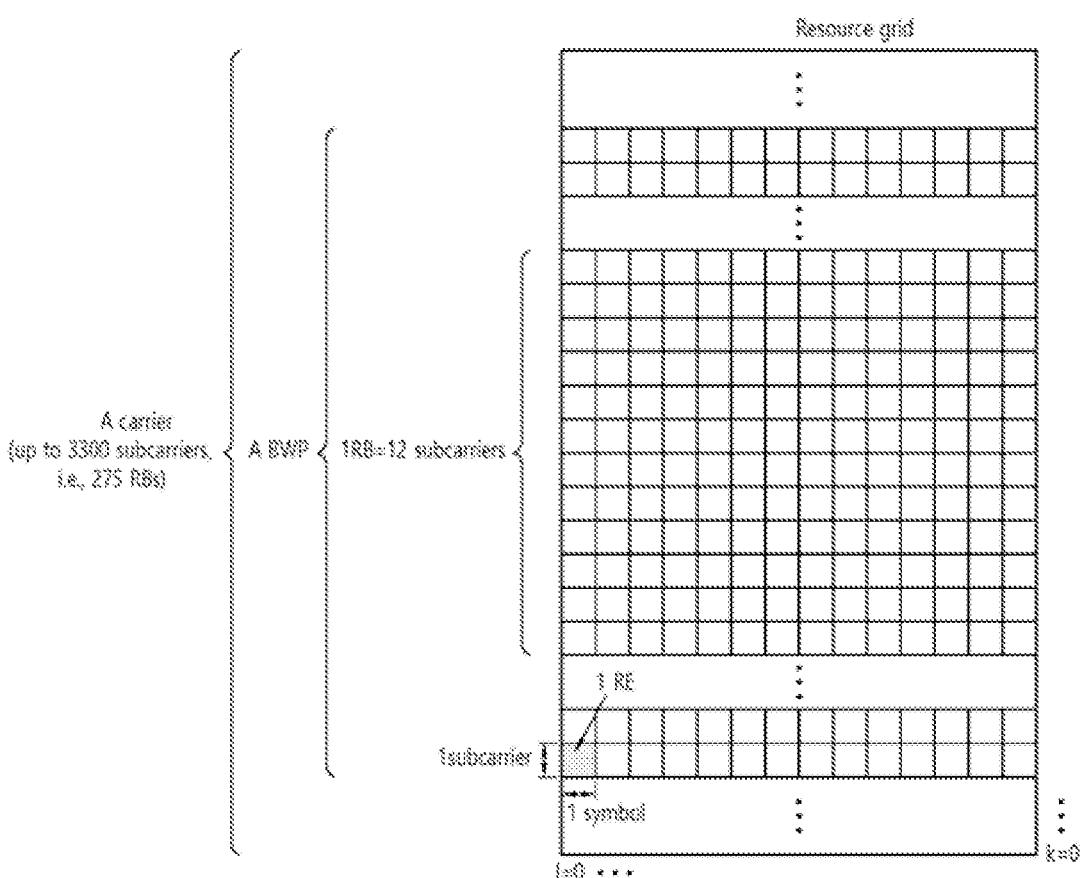
FIG. 7 shows a structure of a slot of an NR frame, in accordance with an embodiment of the present disclosure.

FIG. 7 shows a structure of a slot.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A PDCCH (physical downlink control channel) may consist of one or more control channel elements (CCEs), as shown in Table 4 below.

TABLE 4

| Aggregation level | Number of CCEs |
|---|---|
| 1 | 1 |
| 2 | 2 |
| 4 | 4 |
| 8 | 8 |
| 16 | 16 |

That is, a PDCCH may be transmitted through resource consisting of 1, 2, 4, 8 or 16 CCEs. Here, the CCE consists of 6 resource element groups (REGs), and one REG consists of one resource block in the frequency domain and consists of one orthogonal frequency division multiplexing (OFDM) in the time domain.

Meanwhile, in NR, a new unit called a control resource set (CORESET) may be introduced. A UE may receive a PDCCH in the CORESET.

Figure 8:
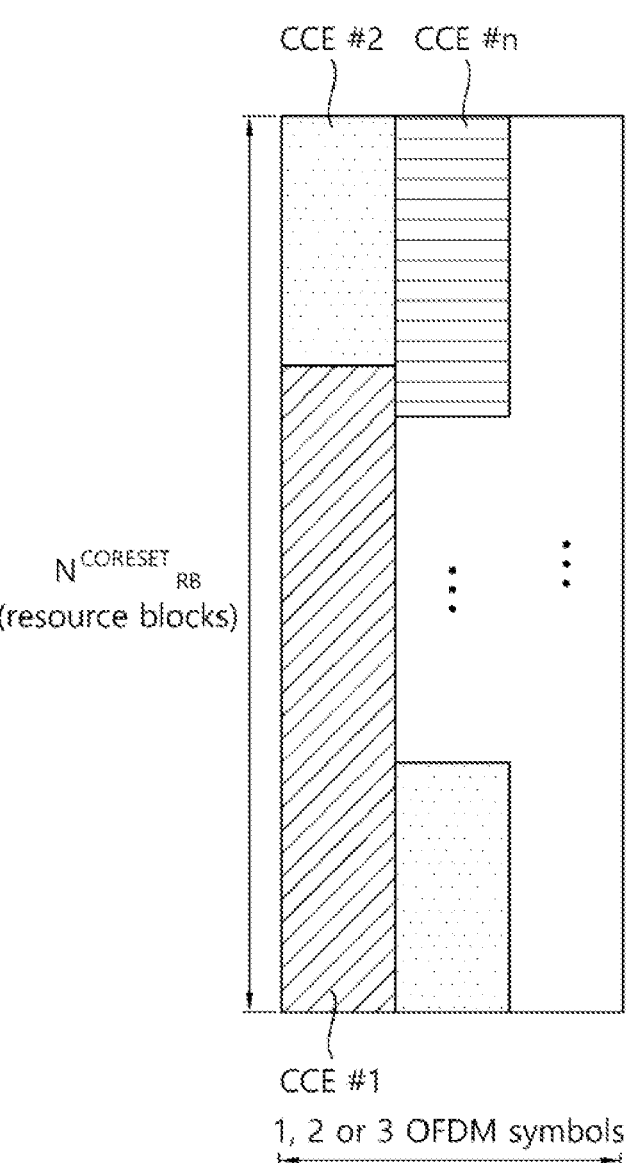
FIG. 8 shows a CORESET.

FIG. 8 shows a CORESET.

Referring to FIG. 8, the CORESET may consist of $N^{CORESET}_{RB}$ resource blocks in the frequency domain and consist $N^{CORESET}_{symb} \in \{1, 2, 3\}$ symbols in the time domain. $N^{CORESET}_{RB}$, $N^{CORESET}_{symb}$ may be provided by a base station through a higher layer signal. As shown in FIG. 8, a plurality of CCEs (or REGs) may be included in the CORESET.

The UE may attempt PDCCH detection in the CORESET in units of 1, 2, 4, 8 or 16 CCEs. One or a plurality of CCEs capable of attempting PDCCH detection may be referred to as a PDCCH candidate.

The UE may be configured with a plurality of CORE-SETs.

Figure 9:
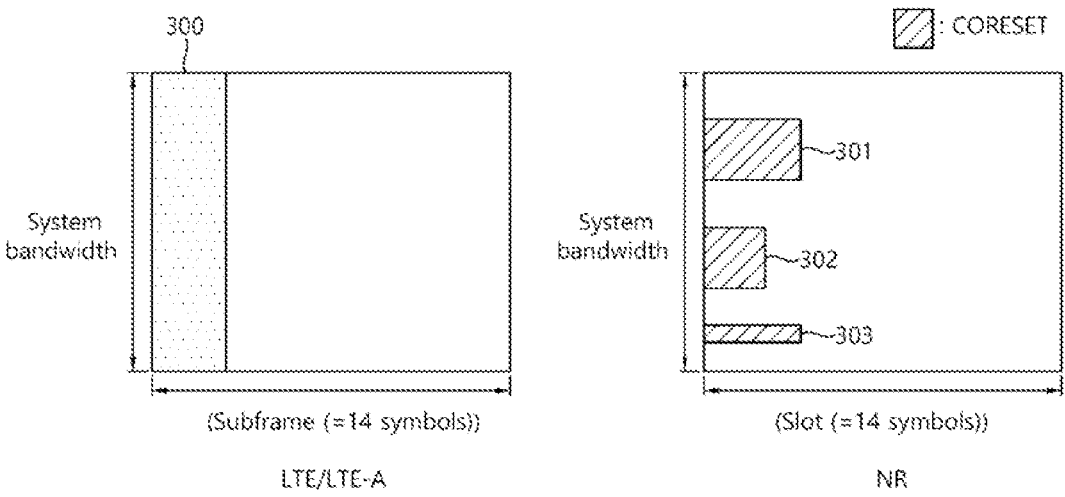
FIG. 9 is a view illustrating a difference between a conventional control region and a CORESET in NR.

FIG. 9 is a view illustrating a difference between a conventional control region and a CORESET in NR.

Referring to FIG. 9, a control region 300 in a conventional wireless communication system (e.g., LTE/LTE-A) is con-figured over the entire system band used by the base station. All UEs except for some UEs (e.g., eMTC/NB-IoT UE) supporting only a narrow band need to receive the radio signal of the entire system band transmitted by the base station, in order to properly receive/decode control infor-mation transmitted by the base station.

In contrast, in NR, the above-described CORESET was introduced. The CORESETs 301, 302 and 303 may be radio resources for control information to be received by the UE, and may use only part of the entire system band. The base station may allocate a CORESET to each UE and transmit control information through the allocated CORESET. For example, in FIG. 9, a first CORESET 301 may be allocated to UE1, a second CORESET 302 may be allocated to a second UE and a third CORESET 303 may be allocated to UE3. In NR, the UE may receive control information of the base station even if the entire system band is not necessarily received.

The CORESET may include a UE-specific CORESET for transmitting UE-specific control information and a common CORESET for transmitting common control information to all UEs.

Meanwhile, in NR, high reliability may be required according to the application field, and, in this situation, a target block error rate (BLER) for downlink control infor-mation (DCI) transmitted through a downlink control chan-nel (e.g., a physical downlink control channel (PDCCH)) may be significantly lower than that of the prior art. As an example of a method of satisfying such a high reliability requirement, the amount of content included in the DCI may be reduced and/or the amount of resources used during DCI transmission may be increased. In this case, resource may include at least one of resource in a time domain, resource in a frequency domain, resource in a code domain, or resource in a space domain.

Meanwhile, in NR, the following technologies/features may be applied.

<Self-Contained Subframe Structure>

Figure 10:
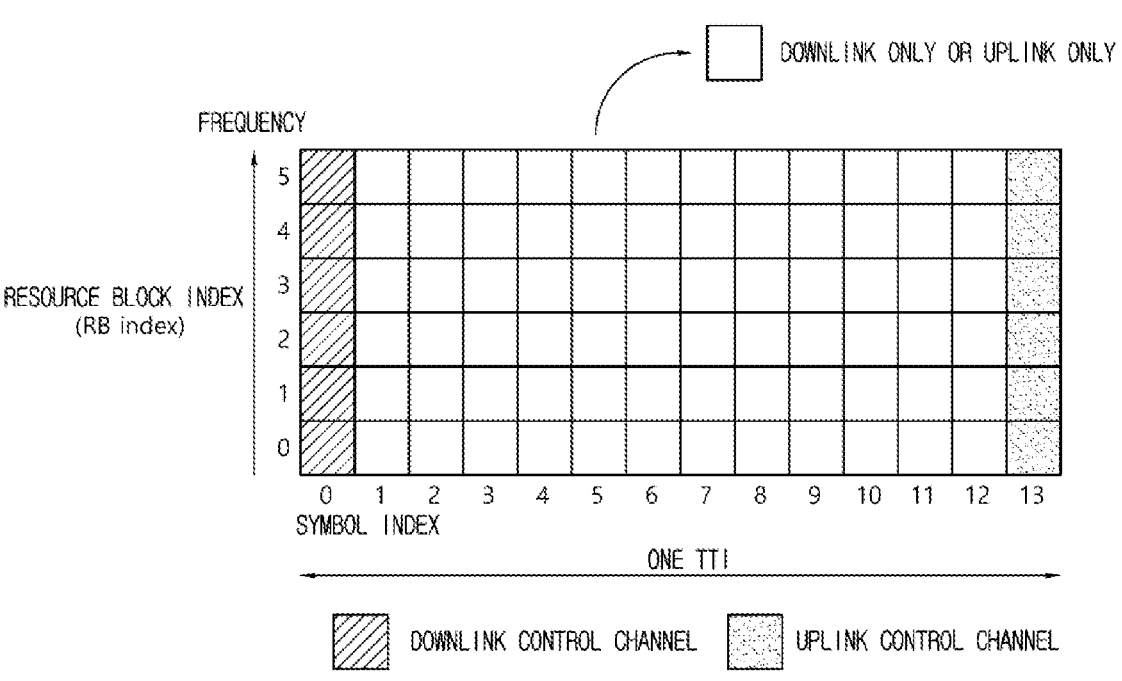
FIG. 10 shows an example of a frame structure for anew radio access technology.

FIG. 10 shows an example of a frame structure for a new radio access technology.

In NR, for the purpose of minimizing latency, as shown in FIG. 10, within one TTI, a structure in which a control channel and a data channel are time division multiplexed (TDM) may be considered as one of frame structures.

In FIG. 10, a hatched region indicates a downlink control region and a black portion indicates an uplink control region. An unmarked region may be used to transmit downlink (DL) data or to transmit uplink (UL) data. This structure is characterized in that DL transmission and UL transmission are sequentially performed within one subframe and DL data may be transmitted and UL ACK/NACK (Acknowledge-ment/Not-acknowledgement) may be received in a sub-frame. As a result, when data transmission error occurs, a time required for data retransmission may be reduced, thereby minimizing latency of final data transmission.

In a data and control TDMed subframe structure, there is a need for a time gap for a process of switching a base station and a UE from a transmission mode to a reception mode or from a reception mode to a transmission mode. To this end, in a self-contained subframe structure, some OFDM sym-bols at the time of switching from DL to UL may be set to a guard period (GP).

Figure 11:
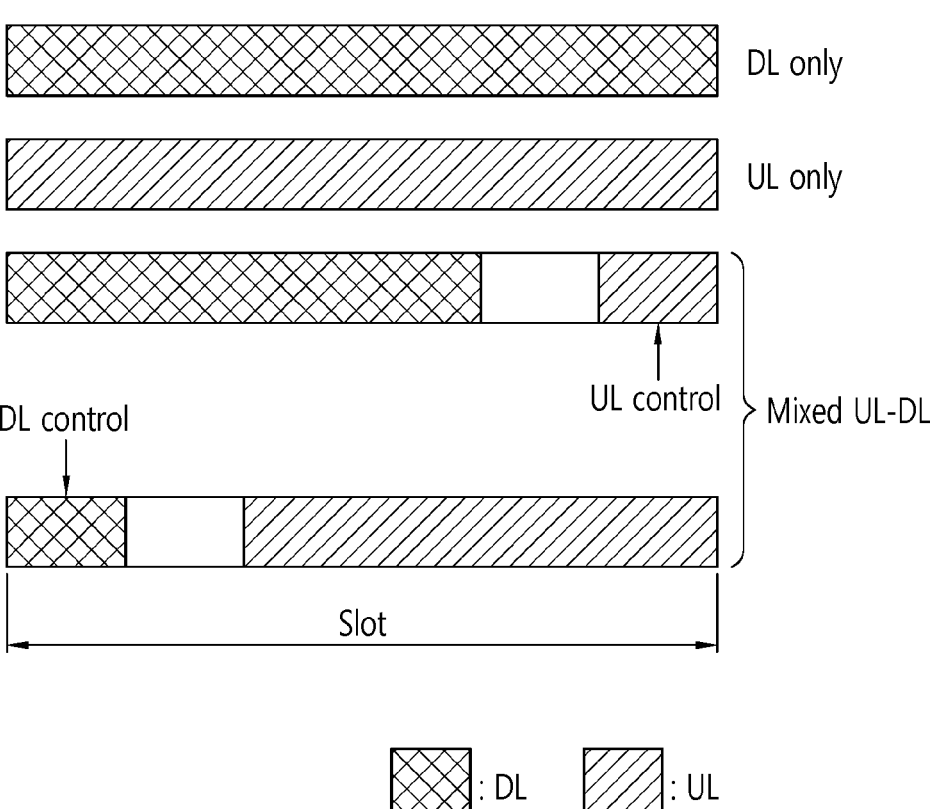
FIG. 11 shows an example of a self-contained slot structure.

FIG. 11 shows an example of a self-contained slot struc-ture.

Referring to FIG. 11, one slot may have a self-contained structure in which all a DL control channel, DL or UL data, a UL control channel, etc. may be included. For example, the first N symbols in the slot may be used to transmit a DL control channel (hereinafter, DL control region) and the last M symbols in the slot may be used to transmit a UL control channel (hereinafter, UL control region). Each of N and M is an integer greater than or equal to 0. A resource region (hereinafter, data region) between the DL control region and the UL control region may be used for DL data transmission or UL data transmission. For example, the following con-figurations may be considered. Each region is listed in chronological order.

1. DL only configuration
2. UL only configuration
3. Mixed UL-DL configuration
   DL region+GP (Guard Period)+UL control region
   DL control region+GP+UL region Here, the DL region may be (i) DL data region and (ii) DL control region+DL data region. The UL region may be (i) UL data region and (ii) UL data region+UL control region.

A PDCCH may be transmitted in the DL control region and a PDSCH may be transmitted in the DL data region. A PUCCH may be transmitted in the UL control region and a PUSCH may be transmitted in the UL data region. In the PDCCH, downlink control information (DCI), for example, DL data scheduling information, UL data scheduling infor-mation, etc. may be transmitted. In the PUCCH, uplink control information (UCI), for example, ACK/NACK (Posi-tive Acknowledgement/Negative Acknowledgement) infor-mation for DL data, CSI (Channel State Information), SR (Scheduling Request), etc. may be transmitted. The GP may provide a time gap in a process of switching a base station and a UE from a transmission mode to a reception mode or from a reception mode to a transmission mode. Some symbols at the time of switching from DL to UL in a subframe may be set to a GP.

<Analog Beamforming #1>

In millimeter wave (mmW), a wavelength is shortened and thus a plurality of antenna elements may be installed in the same area. That is, in a 30-GHz band, a wavelength is 1 cm and a total of 100 antenna elements may be installed in the form of a two-dimensional array at an interval of 0.5 wavelength (lambda) in a 5×5-cm panel. Therefore, in mmW, beamforming (BF) gain is increased using a plurality of antennal elements, thereby increasing coverage or throughput.

In this case, independent beamforming for each frequency resource is possible when it has a transceiver unit (TXRU) such that transmit power and phase control is possible for each antenna element. However, when TXRUs are installed in all 100 antenna elements, effectiveness is lowered in terms of cost. Therefore, a method of mapping a plurality of antenna elements to one TXRU and adjusting a beam direction by an analog phase shifter is considered. Such an analog beamforming method has a disadvantage in that one beam direction is made in the entire band and thus frequency-selective beamforming cannot be performed.

As an intermediate form of digital BF and analog BF, hybrid BF having B TXRUs less than Q antennal elements may be considered. In this case, although there is a difference according to the connection method of B TXRUs and Q antenna elements, the number of directions of beams which can be transmitted simultaneously is limited to B or less.

<Analog Beamforming #2>

When a plurality of antennas is used in the NR system, a hybrid beamforming technique in which digital beamforming and analog beamforming are combined is emerging. In this case, in analog beamforming (or RF beamforming), precoding (or combining) is performed in a RF stage, thereby reducing the number of RF chains and the number of D/A (or A/D) converters and obtaining performance close to digital beamforming. For convenience, the hybrid beamforming structure may be represented by N TXRUs and M physical antennas. Then, digital beamforming for L data layers to be transmitted by a transmitter may be represented by a N×L matrix. Thereafter, transformed N digital signals may be transformed into an analog signal through a TXRU and then analog beamforming represented by an M×N matrix is applied.

Figure 12:
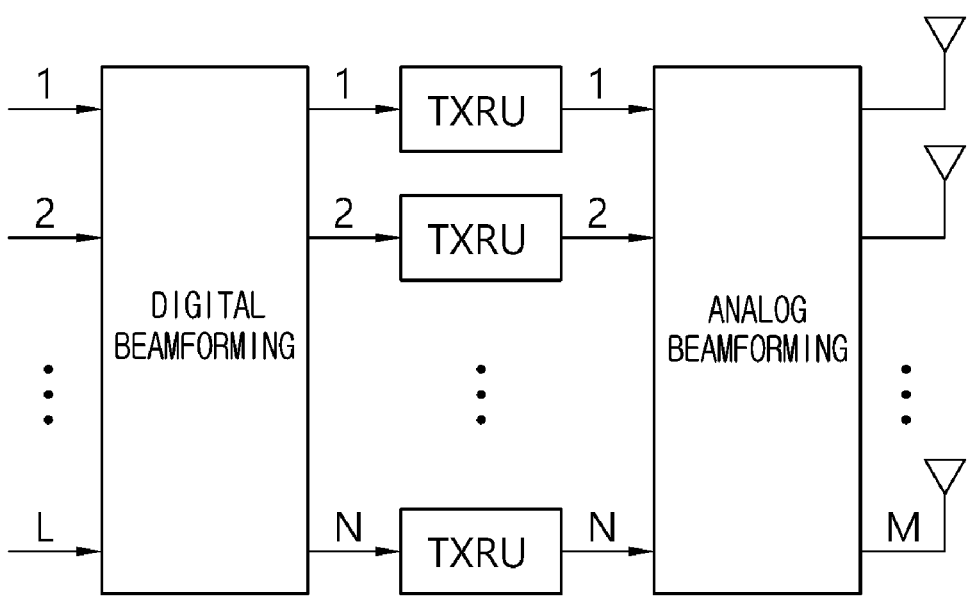
FIG. 12 abstractly illustrates a hybrid beamforming structure from the viewpoint of the TXRU and the physical antenna.

FIG. 12 abstractly illustrates a hybrid beamforming structure from the viewpoint of the TXRU and the physical antenna.

In FIG. 12, the number of digital beams is L and the number of analog beams is N. Furthermore, in the NR system, a direction supporting more efficient beamforming to a UE located in a specific area by designing a base station to change analog beamforming in units of symbols is being considered. Furthermore, in FIG. 12, when N specific TXRUs and M RF antennas are defined as one antenna panel, in the NR system, a method of introducing a plurality of antenna panels to which independent hybrid beamforming is applicable is also being considered.

As described above, when the base station uses a plurality of analog beams, since analog beams advantageous for signal reception vary according to the UE, for at least a synchronization signal, system information, paging, etc., beam sweeping operation in which a plurality of analog beams to be applied by a base station in a specific subframe vary according to the symbol such that all UEs have a reception occasion is being considered.

Figure 13:
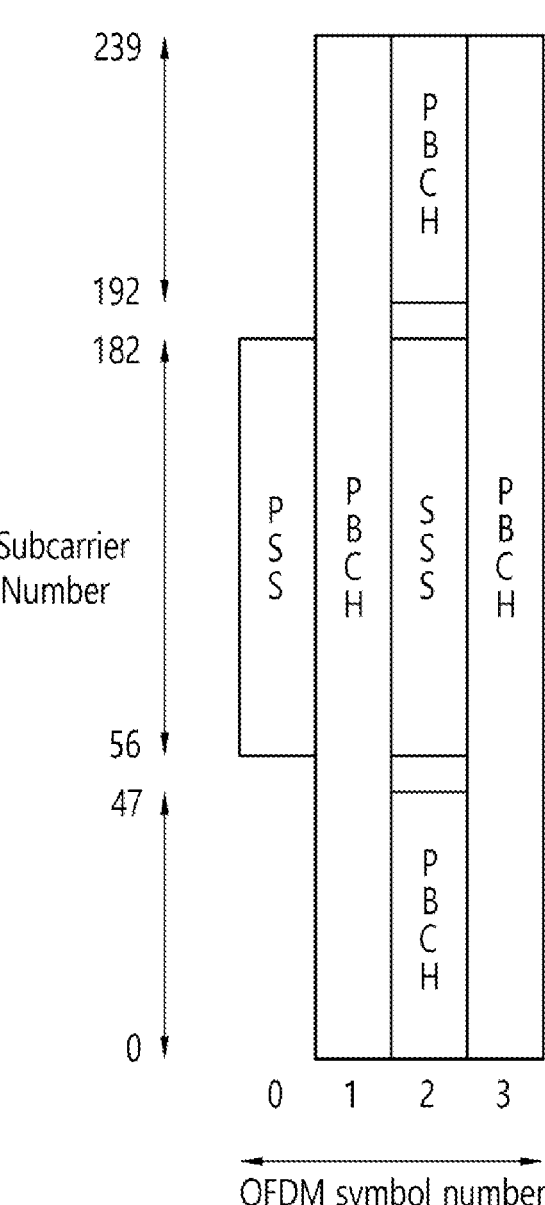
FIG. 13 shows a synchronization signal and a PBCH (SS/PBCH) block.

FIG. 13 shows a synchronization signal and a PBCH (SS/PBCH) block.

According to FIG. 13, an SS/PBCH block consists of a PSS and an SSS each occupying one symbol and 127 subcarriers, and a PBCH spanning three OFDM symbols and 240 subcarriers but having an unused portion for the SSS left in the middle on one symbol. Periodicity of the SS/PBCH block may be configured by a network and a time position at which the SS/PBCH block may be transmitted may be determined by a subcarrier spacing.

For the PBCH, polar coding may be used. The UE may assume a band-specific subcarrier spacing for the SS/PBCH block, unless the network configures the UE to assume different subcarrier spacings.

PBCH symbols carry frequency-multiplexed DMRSs thereof. QPSK modulation may be used for the PBCH. 1008 unique physical layer cell IDs may be given.

For a half frame having SS/PBCH blocks, first symbol indices for candidate SS/PBCH blocks are determined according to the subcarrier spacing of the SS/PBCH blocks described below.

Case A—subcarrier spacing 15 kHz: First symbols of candidate SS/PBCH blocks have indices of {2, 8}+14*n. For a carrier frequency equal to or less than 3 GHz, n=0, 1. For a carrier frequency greater than 3 GHz and equal to or less than 6 GHz, n=0, 1, 2, 3.

Case B—subcarrier spacing 30 kHz: First symbols of candidate SS/PBCH blocks have indices of {4, 8, 16, 20}+28*n. For a carrier frequency equal to or less than 3 GHz, n=0. For a carrier frequency greater than 3 GHz and equal to or less than 6 GHz, n=0, 1.

Case C—subcarrier spacing 30 kHz: First symbols of candidate SS/PBCH blocks have indices of {2, 8}+14*n. For a carrier frequency equal to or less than 3 GHz, n=0, 1. For a carrier frequency greater than 3 GHz and equal to or less than 6 GHz, n=0, 1, 2, 3.

Case D—subcarrier spacing 120 kHz: First symbols of candidate SS/PBCH blocks have indices of {4, 8, 16, 20}+28*n. For a carrier frequency greater than 6 GHz, n=0, 1, 2, 3, 5, 6, 7, 8, 10, 11, 12, 13, 15, 16, 17, 18.

Case E—subcarrier spacing 240 kHz: First symbols of candidate SS/PBCH blocks have indices of {8, 12, 16, 20, 32, 36, 40, 44}+56*n. For a carrier frequency greater than 6 GHz, n=0, 1, 2, 3, 5, 6, 7, 8.

Candidate SS/PBCH blocks in a half frame are indexed in ascending order from 0 to L−1 on the time axis. The UE shall determine 2 LSB bits for L=4 of the SS/PBCH block index per half frame and 3 LSB bits for L>4 from one-to-one mapping with the index of the DMRS sequence transmitted in the PBCH. For L=64, the UE shall determine 3 MSB bits of the SS/PBCH block index per half frame by PBCH payload bits.

By a higher layer parameter 'SSB-transmitted-SIB1', indices of the SS/PBCH blocks in which the UE cannot receive other signals or channels in REs overlapping REs corresponding to the SS/PBCH blocks may be configured. In addition, by a higher layer parameter 'SSB-transmitted', SS/PBCH indices of the SS/PBCH blocks per serving cell in which the UE cannot receive different signals or channels in REs overlapping REs corresponding to the SS/PBCH blocks may be configured. The configuration by 'SSB-transmitted' may take precedence over the configuration by 'SSB-transmitted-SIB1'. By a higher layer parameter 'SSB-periodicityServingCell', periodicity of the half frame for reception of the SS/PBCH blocks per serving cell may be configured. When the UE is not configured with periodicity of the half frame for reception of the SS/PBCH blocks, the UE shall assume periodicity of the half frame. The UE may assume that periodicity is the same for all SS/PBCH blocks in the serving cell.

Figure 14:
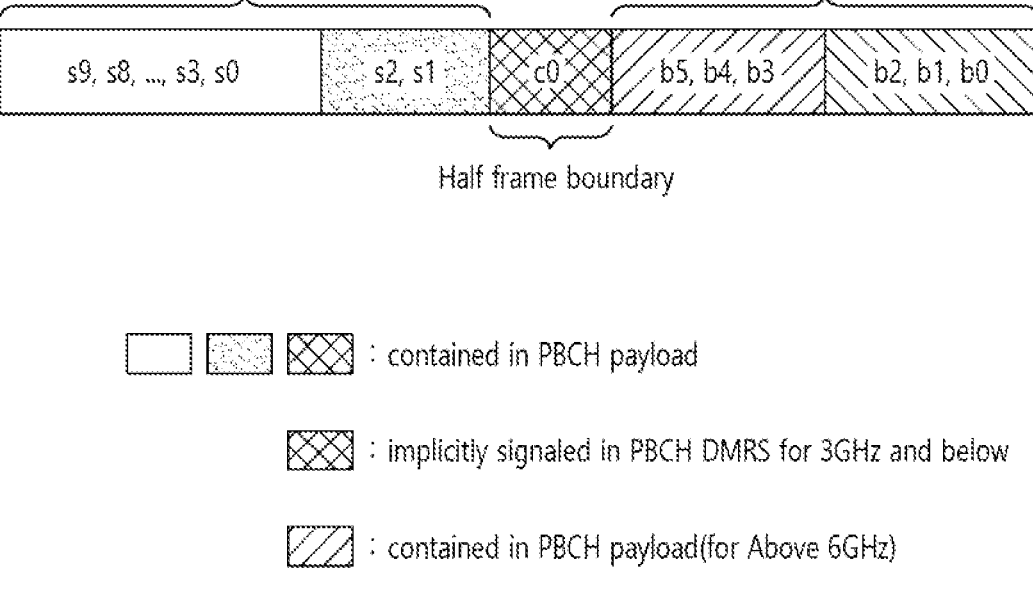
FIG. 14 illustrates a method of obtaining timing information by a UE.

FIG. 14 illustrates a method of obtaining timing information by a UE.

First, the UE may obtain 6-bit SFN information through MIB (MasterInformationBlock) received in the PBCH. In addition, SFN 4 bits may be obtained in a PBCH transport block.

Second, the UE may obtain a 1-bit half frame indicator as part of a PBCH payload. Below 3 GHz, the half frame indicator may be implicitly signaled as part of the PBCH DMRS for Lmax=4.

Finally, the UE may obtain an SS/PBCH block index by a DMRS sequence and a PBCH payload. That is, for a period of 5 ms, LSB 3 bits of the SS block index may be obtained by the DMRS sequence. In addition, MSB 3 bits of timing information are explicitly carried within the PBCH payload (for above 6 GHz).

In initial cell selection, the UE may assume that a half frame having SS/PBCH blocks occurs with periodicity of two frames. When the SS/PBCH block is detected, the UE determines that there is a control resource set for a Type0-PDCCH common search space when $k_{SSB}<23$ for FR2 and $k_{SSB}<11$ for FR2. The UE determines that there is no control resource set for Type0-PDCCH common search space when $k_{SSB}>23$ for FR1 and $k_{SSB}>11$ for FR2.

For a serving cell without transmission of SS/PBCH blocks, the UE obtains time and frequency synchronization of the serving cell based on reception of SS/PBCH blocks on the PSCell or a primary cell of a cell group for the serving cell.

Hereinafter, system information acquisition will be described.

System information (SI) is divided into MasterInformationBlock (MIB) and a plurality of SystemInformationBlocks (SIBs).

MIB is always transmitted on a BCH with a period of 80 ms and is repeated within 80 ms, and includes parameters necessary to acquire SystemInformationBlockType1 (SIB1) from the cell;

SIB1 is transmitted with periodicity and repetition on the DL-SCH. SIB1 includes information on availability and scheduling (e.g., periodicity, SI-window size) of other SIBs. In addition, whether these (that is, other SIBs) are provided based on a periodic broadcast or according to a request is indicated. When the other SIBs are provided according to the request, SIB1 includes information for performing an SI request;

SIBs other than SIB1 are carried in a SystemInformation (SI) message transmitted on the DL-SCH. Each SI message is transmitted in a time domain window (called an SI-window) occurring periodically;

For a PSCell and secondary cells, the RAN provides a necessary SI by dedicated signaling. Nevertheless, the UE shall the MIB of the PSCell in order to obtain SFN timing (which may be different from MCG) of the SCH. When a related SI for the secondary cell is changed, the RAN releases and adds a related secondary cell. For the PSCell, the SI may be changed only by reconfiguration with Sync.

Figure 15:
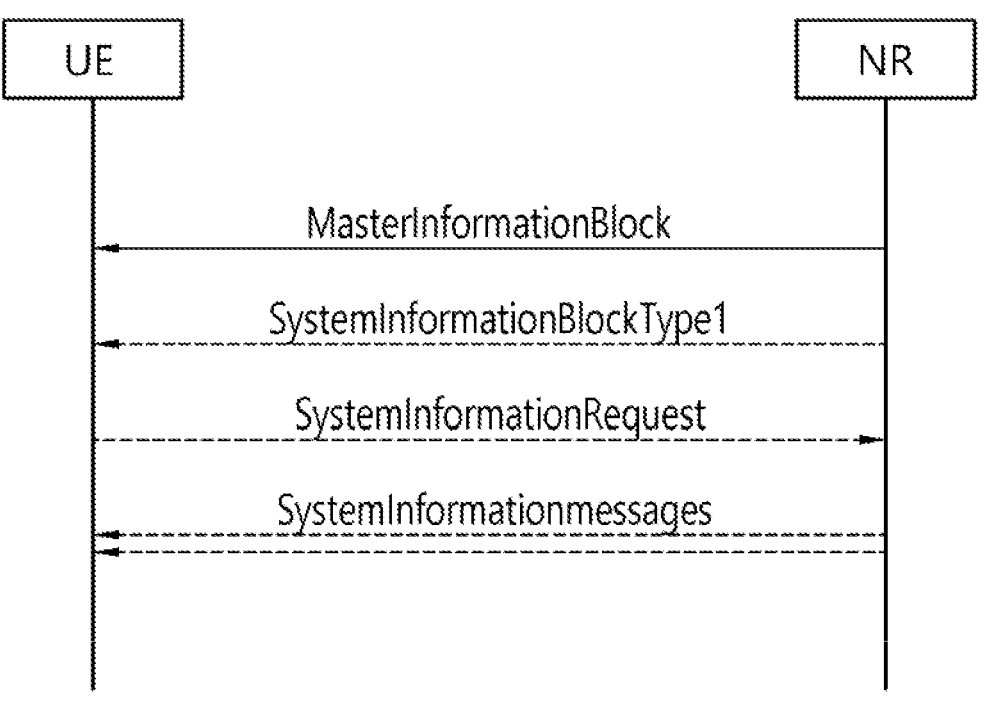
FIG. 15 shows an example of acquiring system information of a UE.

FIG. 15 shows an example of acquiring system information of a UE.

According to FIG. 15, a UE may receive an MIB from a network and then receive SIB1. Thereafter, the UE may transmit a system information request to the network and receive a 'SystemInformation message' from the network.

The UE may apply a system information acquisition procedure for AS (access stratum) and NAS (non-access stratum) information acquisition.

The UE in the RRC_IDLE and RRC_INACTIVE state shall ensure (at least) valid versions of MIB, SIB1 and SystemInformationBlockTypeX (according to the related RAT support for mobility controlled by the UE).

The UE in the RRC_CONNECTED state shall ensure valid version of MIB, SIB1, and SystemInformationBlockTypeX (according to mobility support for related RAT).

The UE shall store related SI acquired from a currently camped/serving cell. The version of the SI obtained and stored by the UE is valid only for a certain time. The UE may use this stored version of SI, for example, after cell reselection, return from the outside of coverage or system information change instruction.

Hereinafter, random access will be described.

The random access procedure of the UE may be summarized as shown in Table 5 below.

TABLE 5

| | Type of signal | Operated/acquired information |
|---|---|---|
| step 1 | PRACH preamble of uplink | Initial beam acquisition random election of RA-preamble ID |
| step 2 | Random access response on DL-SCH | Timing arrangement information RA-preamble ID Initial uplink grant, temporary C-RNTI |
| step 3 | Uplink transmission on UL-SCH | RRC connection request UE identifier |
| step 4 | Contention resolution of downlink | C-RNTI on PDCCH for initial access C-RNTI on PDCCH for UE in RRC_CONNECTED |

Figure 16:
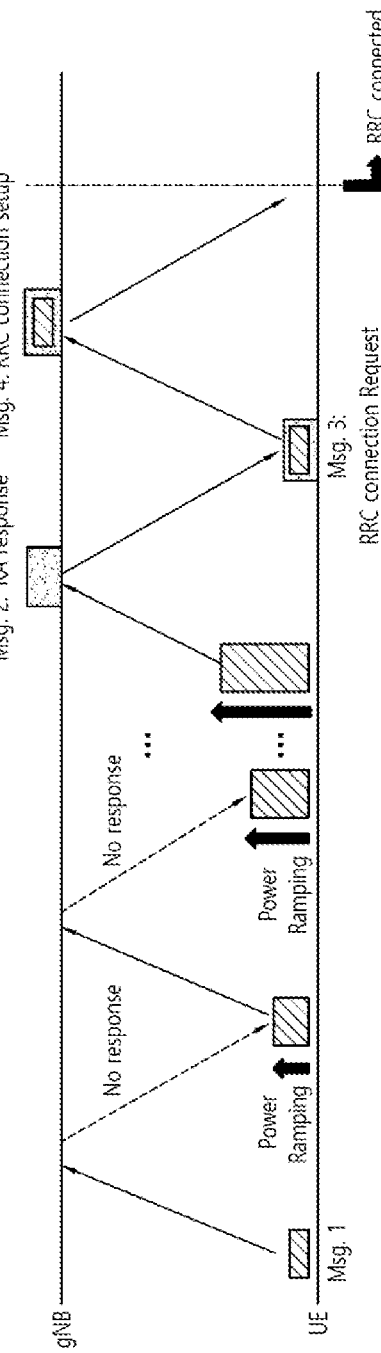
FIG. 16 illustrates a random access procedure.

FIG. 16 illustrates a random access procedure.

According to FIG. 16, first, a UE may transmit a PRACH preamble in uplink as message(Msg) 1 of a random access procedure.

Random access preamble sequences having two different lengths are supported. A long sequence having a length of 839 applies to subcarrier spacings of 1.25 kHz and 5 kHz and a short sequence having a length of 139 applies to subcarrier spacings of 15, 30, 60 and 120 kHz. The long sequence supports an inrestricted set and a restricted set of type A and type B, whereas the short sequence supports only the inrestricted set.

A plurality of RACH preamble formats is defined by one or more RACH OFDM symbols, different cyclic prefix (CP) and a guard time. The PRACH preamble configuration to be used is provided to the UE as system information.

When there is no response to Msg1, the UE may retransmit the power-ramped PRACH preamble within a prescribed number of times. The UE calculates PRACH transmit power for retransmission of the preamble based on the most recent estimated path loss and power ramping counter. When the UE performs beam switching, the power ramping counter does not change.

Figure 17:
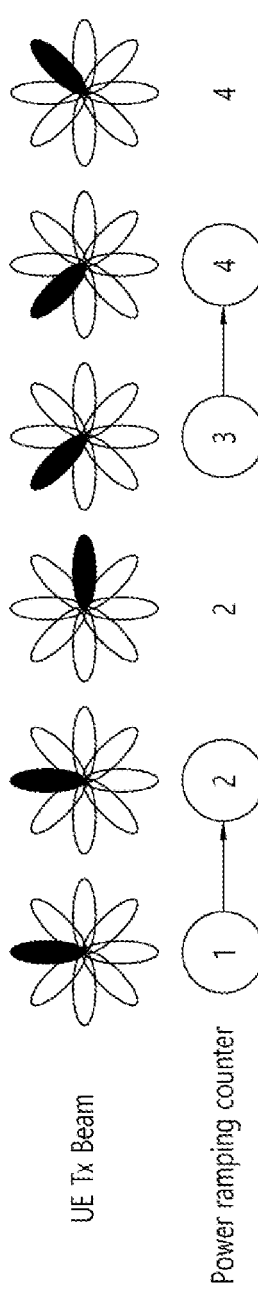
FIG. 17 illustrates the power ramping counter.

FIG. 17 illustrates the power ramping counter.

The UE may perform power ramping for retransmission of the random access preamble based on the power ramping counter. Here, as described above, the power ramping counter does not change when the UE performs beam switching upon PRACH retransmission.

According to FIG. 17, when the UE retransmits the random access preamble for the same beam such as when the power ramping counter increases from 1 to 2 and from 3 to 4, the UE increases the power ramping counter by 1. However, when the beam is changed, the power ramping counter does not change upon PRACH retransmission.

Figure 18:
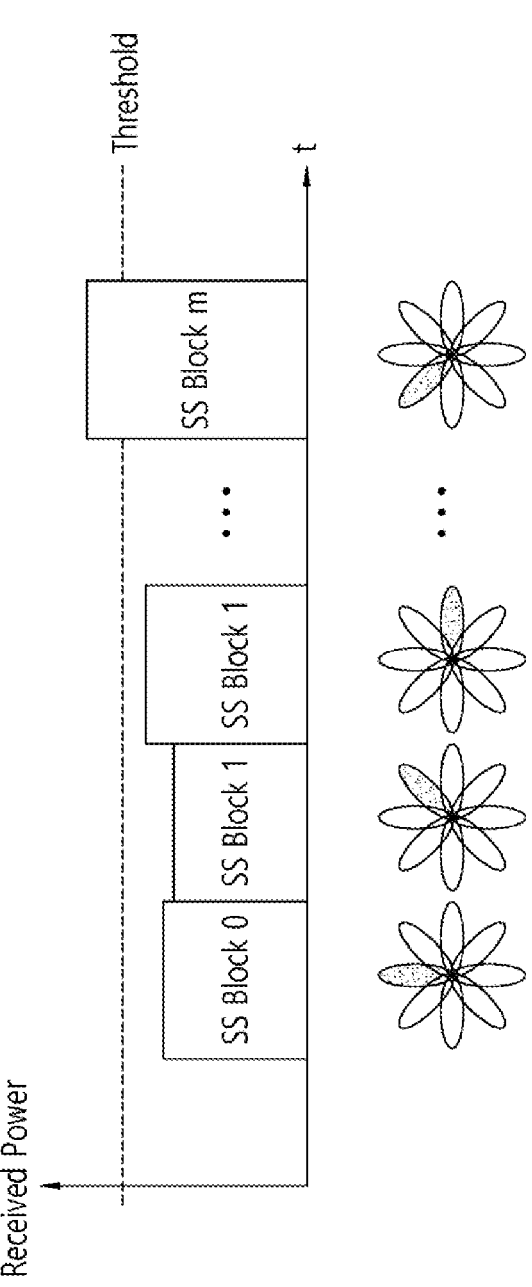
FIG. 18 illustrates the concept of the threshold of an SS block for a RACH resource relationship.

FIG. 18 illustrates the concept of the threshold of an SS block for a RACH resource relationship.

System information informs the UE of a relationship between SS blocks and RACH resources. A threshold of the SS block for the RACH resource relationship is based on RSRP and network configuration. Transmission or retransmission of the RACH preamble is based on an SS block satisfying a threshold. Accordingly, in the example of FIG. 18, since an SS block m exceeds the threshold of the received power, the RACH preamble is transmitted or retransmitted based on the SS block m.

Thereafter, when the UE receives a random access response on a DL-SCH, the DL-SCH may provide timing arrangement information, an RA-preamble ID, an initial uplink grant and a temporary C-RNTI.

Based on the above information, the UE may perform uplink transmission on a UL-SCH as Msg3 of the random access procedure. Msg3 may include an RRC connection request and a UE identifier.

In response thereto, the network may transmit Msg4 which may be treated as a contention resolution message in downlink. By receiving this, the UE may enter an RRC connection state.

<Bandwidth Part (BWP)>

In the NR system, up to 400 megahertz (MHz) per component carrier (CC) may be supported. When a UE operating in such a wideband CC operates while RF for all CCs is always turned on, UE battery consumption may increase. Alternatively, when considering several use cases (e.g., eMBB, URLLC, mMTC, etc.) operating within one wideband CC, different numerology (e.g., sub-carrier spacing (SCS)) for each frequency band within the CC may be supported. Alternatively, capability for maximum bandwidth differ between UEs. In consideration of this, the base station may instruct the UE to operate in partial bandwidth rather than the entire bandwidth of the wideband CC, and the partial bandwidth is defined as a bandwidth part (BWP) for convenience. The BWP may consist of continuous resource blocks (RBs) on the frequency axis and correspond to one numerology (e.g., subcarrier spacing, cyclic prefix (CP) length, slot/mini-slot duration, etc.).

On the other hand, the base station may set a plurality of BWPs even within one CC configured for the UE. For example, in a PDCCH monitoring slot, a BWP occupying a relatively small frequency domain may be set and a PDSCH indicated in the PDCCH may be scheduled on a larger BWP than it. Alternatively, when UEs are concentrated in a specific BWP, some UEs may be set to other BWPs for load balancing. Alternatively, in consideration of frequency domain inter-cell interference cancellation between neighboring cells, a partial spectrum of the entire bandwidth is excluded and both BWPs may be configured even within the same slots. That is, the base station may configure at least one DL/UL BWP for a UE associated with a wideband CC, activate at least one DL/UL BWP among DL/UL BWP(s) set at a specific point in time (by L1 signaling or MAC CE or RRC signaling), and switching to another configured DL/UL BWP may be indicated (by L1 signaling or MAC CE or RRC signaling) or, when a timer value expires based on a timer, switching to a determined DL/UL BWP may be performed. In this case, the activated DL/UL BWP is defined as an active DL/UL BWP. However, when the UE is in an initial access process or before RRC connection is set up, configuration for the DL/UL BWP may not be received, and the DL/UL BWP assumed by the UE in this situation is defined as an initial active DL/UL BWP.

<DRX (Discontinuous Reception)>

DRX (Discontinuous Reception) means an operation mode in which a UE reduces battery consumption and thus the UE can discontinuously receive a downlink channel.

That is, the UE configured with DRX may discontinuously receive a DL signal, thereby reducing power consumption.

DRX operation is performed within the DRX cycle indicating a time interval in which on duration is periodically repeated. The DRX cycle includes an on duration and a sleep duration (or opportunity for DRX). The on-duration indicates a time interval during which a PDCCH is monitored to receive the PDCCH.

DRX may be performed in RRC (Radio Resource Control) IDLE state (or mode), RRC_INACTIVE state (or mode) or RRC_CONNECTED state (or mode). In the RRC_IDLE state and the RRC_INACTIVE state, DRX may be used to discontinuously receive a paging signal.

RRC_IDLE state: state in which wireless connection (RRC connection) is not established between the base station and the UE.

RRC_INACTIVE state: state in which wireless connection (RRC connection) is established between the base station and the UE but wireless connection is inactivated.

RRC_CONNECTED state: state in which wireless connection (RRC connection) is established between the base station and the UE.

DRX may be basically divided into an idle mode DRX, a connected DRX (C-DRX) and an extended DRX.

DRX applied in the IDLE state may be referred to as idle mode DRX, and DRX applied in the CONNECTED state may be referred to as connected mode DRX (C-DRX).

The eDRX (Extended/Enhanced DRX) is a mechanism that can extend the cycles of the idle mode DRX and the C-DRX, and the eDRX (Extended/Enhanced DRX) may be mainly used for (massive) IoT application. In the idle mode DRX, whether eDRX is allowed may be configured based on system information (e.g., SIB1). SIB1 may include an eDRX-allowed parameter. The eDRX-allowed parameter is a parameter indicates whether the idle mode extended DRX is allowed.

<Idle Mode DRX>

In the idle mode, the UE may use DRX to reduce power consumption. One paging occasion (PO) is a subframe in which P-RNTI (Paging-Radio Network Temporary Identifier) may be transmitted through a PDCCH (Physical Downlink Control Channel) or MPDCCH (MTC PDCCH) or NPDCCH (Narrowband PDCCH) (which addresses a paging message for NB-IoT).

In the P-RNTI transmitted through a MPDCCH, the PO may indicate a start subframe of MPDCCH repetition. In the case of the P-RNTI transmitted through a NPDCCH, when a subframe determined by the PO is not a valid NB-IoT downlink subframe, the PO may indicate a start subframe of NPDCCH repetition. Accordingly, a first valid NB-IoT downlink subframe after the PO is the start subframe of NPDCCH repetition.

One paging frame (PF) is one radio frame which may include one or a plurality of paging occasions. When DRX is used, the UE monitors only one PO per DRX cycle. One paging narrow band (PNB) is one narrowband in which paging message reception is performed. PF, PO and PNB may be determined based on DRX parameters provided by system information.

Figure 19:
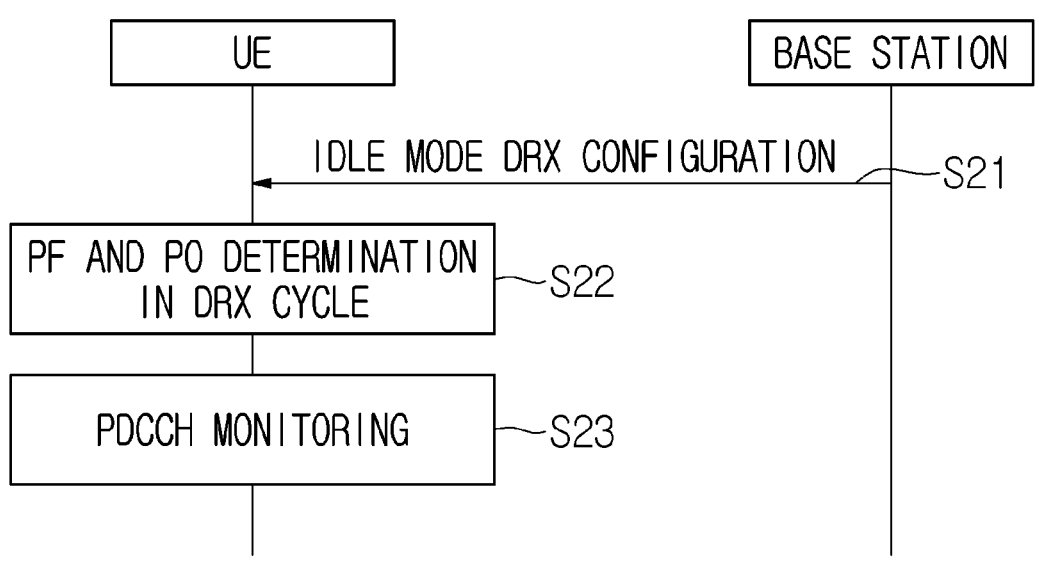
FIG. 19 is a flowchart illustrating an example of performing idle mode DRX operation.

FIG. 19 is a flowchart illustrating an example of performing idle mode DRX operation.

According to FIG. 19, a UE may receive an idle mode DRX configuration information from a base station through higher layer signaling (e.g., system information) (S21).

The UE may determine a PF (Paging Frame) and a PO (Paging Occasion) to monitor a PDCCH at a paging DRX cycle based on the idle mode DRX configuration information (S22). In this case, the DRX cycle may include an on-duration and a sleep duration (or opportunity for DRX).

The UE may monitor a PDCCH in the PO of the determined PF (S23). Here, for example, the UE monitors only one subframe PO per paging DRX cycle. In addition, when the UE receives a PDCCH scrambled by a P-RNTI during the on-duration (that is, when paging is detected), the UE may transition to the connected mode and transmit and receive data to and from the base station.

<Connected Mode DRX (C-DRX)>

C-DRX means DRX applied in the RRC connected state. The DRX cycle of C-DRX may consist of a short DRX cycle and/or a long DRX cycle. Here, the short DRX cycle may correspond to an option.

When C-DRX is configured, the UE may perform PDCCH monitoring for the on-duration. When a PDCCH is successfully detected during PDCCH monitoring, the UE may operate (or execute) an inactive timer and maintain an awake state. In contrast, when the PDCH is not successfully detected during the PDCCH monitoring, the UE may enter the sleep state after the on-duration is finished.

When C-DRX is configured, PDCCH reception occasion (e.g., a slot having a PDCCH search space) may be discontinuously configured based on the C-DRX configuration. In contrast, when C-DRX is not configured, in the present disclosure, PDCCH reception occasion (e.g., a slot having a PDCCH search space) may be continuously configured.

Meanwhile, PDCCH monitoring may be limited to a time interval configured as a measurement gap regardless of C-DRX configuration.

Figure 20:
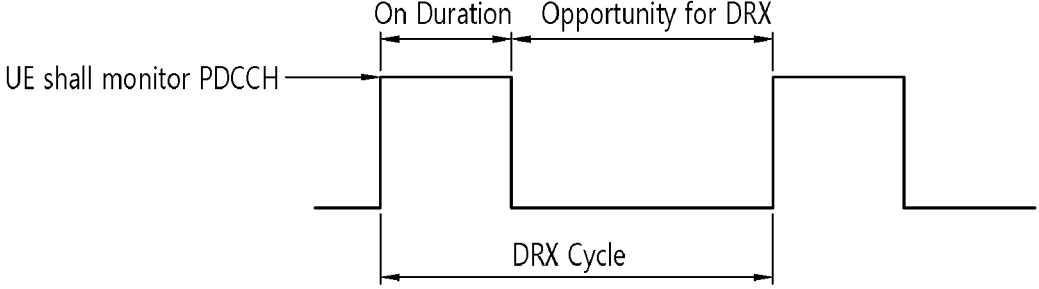
FIG. 20 shows a DRX cycle.

FIG. 20 shows a DRX cycle.

Referring to FIG. 20, the DRX cycle consist of 'On-Duration' and 'Opportunity for DRX'. The DRX cycle defines a time interval in which the 'on-duration' is periodically repeated. The 'on-duration' indicates a time interval in which the UE performs monitoring to receive a PDCCH. When DRX is configured, the UE performs PDCCH monitoring during the 'on-duration'. When there is a PDCCH detected successfully during PDCCH monitoring, the UE operates an inactivity timer and maintains an awake state. In contrast, when there is no PDCCH detected successfully during PDCCH monitoring, the UE enters the sleep state after the 'on-duration' is finished. Accordingly, when DRX is configured, in performing the above-described/proposed procedure and/or method, PDCCH monitoring/reception may be discontinuously performed in the time domain. For example, when DRX is configured, in the present disclosure, a PDCCH reception occasion (e.g., a slot having a PDCCH search space) may be discontinuously configured according to the DRX configuration. In contrast, when DRX is not configured, in performing the above-described/proposed procedure and/or method, PDCCH monitoring/reception may be continuously performed in the time domain. For example, when DRX is not configured, in the present disclosure, a PDCCH reception occasion (e.g., a slot having a PDCCH search space) may be continuously configured. Meanwhile, regardless of whether DRX is configured, PDCCH monitoring may be limited in a time interval configured as a measurement gap.

Table 6 shows a process of a UE related to DRX (RRC_CONNECTED state). Referring to Table 6, DRX configuration information may be received through higher layer (e.g., RRC) signaling, and DRX ON/OFF is controlled by a DRX command of a MAC layer. when DRX is configured, in performing the procedure and/or method described/proposed in the present disclosure, PDCCH monitoring may be continuously performed.

TABLE 6

| | Type of signals | UE procedure |
|---|---|---|
| Step 1 | RRC signaling (MAC-CellGroupConfig) | DRX configuration information reception |
| Step 2 | MAC CE ((Long) DRX command MAC CE) | DRX command reception |
| Step 3 | — | PDCCH monitoring during on-duration of DRX cycle |

The MAC-CellGroupConfig may include configuration information necessary to set a MAC (Medium Access Control) parameter for cell group. MAC-CellGroupConfig may include configuration information of DRX. For example, MAC-CellGroupConfig may include information as follows in order to define DRX.

Value of drx-OnDurationTimer: It defines a length of a start duration of a DRX cycle Value of drx-InactivityTimer: It defines a length of a time interval in which the UE is in an awake state after a PDCCH occasion in which a PDCCH indicating initial UL or DL data is detected.

Value of drx-HARQ-RTT-TimerDL: It defines a length of a maximum time interval until DL retransmission is received after DL initial transmission is received.

Value of drx-HARQ-RTT-TimerDL: It defines a length of a maximum time interval until grant for UL retransmission is received, after grant for UL initial transmission is received.

drx-LongCycleStartOffset: It defines a time length and a start point in time of the DRX cycle.

drx-ShortCycle (optional): It defines a time length of a short DRX cycle.

Here, when any one of drx-OnDurationTimer, drx-InactivityTimer, drx-HARQ-RTT-TimerDL or drx-HARQ-RTT-TimerDL is in operation, the UE performs PDCCH monitoring at every PDCCH occasion while maintaining the awake state.

Hereinafter, machine learning will be described.

Machine learning means that computer programs, processors, etc. improve information processing capabilities through learning using data and processing experience. Most machine learning uses a model composed of a plurality of parameters and optimizing parameters with given data is called learning. Machine learning is divided into supervised learning, unsupervised learning and reinforcement learning, according to the type of a learning problem.

Supervised learning is learning mapping between input and output and is applied to the case where input and output pairs are given as data. For example, when a computer recognizes a license plate at the entrance of a parking lot, if the license plate is contaminated, it may not be properly recognized. In this case, by learning examples of variously contaminated license plates and normal license plates as input and output pairs, it is possible to increase the recognition rate of the license plate.

Unsupervised learning is applied when there is only input and there is no output and the goal is to find regularity between inputs. The results of unsupervised learning are used as input of supervised learning or interpreted by human beings.

Reinforcement learning is applied to a system which takes an action corresponding to given input and examples of such a system may include a robot or a game player. In reinforcement learning, unlike supervised learning, output to given input, that is, a correct action, is not given. Instead, rewards are given for the results of a series of actions and the system performs learning using such rewards.

Hereinafter, deep learning will be described.

Deep learning is a technique used to group or classify objects or data. The core of deep learning is prediction through classification. Computer programs, processors, etc. classify data like humans classifying objects by finding a pattern in numerous data. In such a classification method, supervised learning, unsupervised learning, etc. may be used. In deep learning, an artificial neural network composed of several hidden layers is mainly used. As the number of hidden layers increases, it is expressed as "deep" and a deep layer structure may efficiently a complex function compared to a shallow structure.

Hereinafter, proposals of the present disclosure will be described in greater detail.

The following drawings were provided to explain detailed examples of the present disclosure. Since the names of specific devices described in the drawings or the names of specific signals/messages/fields are presented by way of example, the technical features of the present disclosure are not limited to the specific names used in the following drawings.

Communication systems based on machine learning, including deep learning, are attracting attention as a key technology for next-generation communication systems because they have the advantage of being easy to customize and optimize, respond to environmental changes, and evolve through learning compared to existing communication systems. However, it is difficult to fully utilize these advantages only with simulation or data from some representative environments without data from the actual environment. In the present disclosure, a method and procedure for performing additional learning using data obtained in the actual environment in a basic receiver model optimized for the representative environment and a method of operating a plurality of customized receiver models obtained through this and a basic receiver model are proposed.

Among currently available various machine learning algorithms, the ones most suitable for training of the receiver model include supervised learning and semi-supervised learning. In order to maximize performance in an actual environment using these algorithms, it is very important to sufficiently secure high-quality labeled data reflecting various characteristics of a communication environment, but there is no standard technology for this up to now. A method of using, as labeled data, only a signal that has succeeded in data recovery among signals that transmit actual user data may be considered, but have various problems as follows.

First, in order to improve performance, even though data in the case of data recovery failure shall be used for leaning, it may be difficult to be used as labeled data because accurate data transmitted from a transmitter cannot be known. All signals that have failed data recovery may be stored and used when recovery is performed by HARQ, etc., but system complexity increases.

In addition, data of various environments are unlikely to be secured according to the communication pattern of the user, and, in this case, overall performance may be degraded due to an overfitting phenomenon which is one of major issues in machine learning.

In addition, since securing of user data and learning data is performed at the same time, system complexity increases, that is, instantaneous peak MIPS increases and, in the case of the UE, user experience (UX) may be degraded due to battery consumption acceleration.

In addition, the form of suitable leaning data may vary according to the receiver structure of each base station or UE and a learning algorithm. In actual user data transmission and reception, since it is difficult to consider this part, implementation complexity may increase and learning efficiency may decrease.

Accordingly, the present disclosure proposes a method and procedure for transmitting and receiving learning data between a base station and a UE, which is capable of securing labeled data reflecting both the channel and hardware characteristics of the base station and the UE and ensuring frequency, time and spatial diversity without degrading user experience or increasing system complexity. Meanwhile, the proposed technology may be widely applied not only to the next-generation communication system but also to the existing communication system in that advantages of a machine learning-based communication system may be efficiently used by adding simple functions without significantly changing the existing communication standard.

Figure 21:
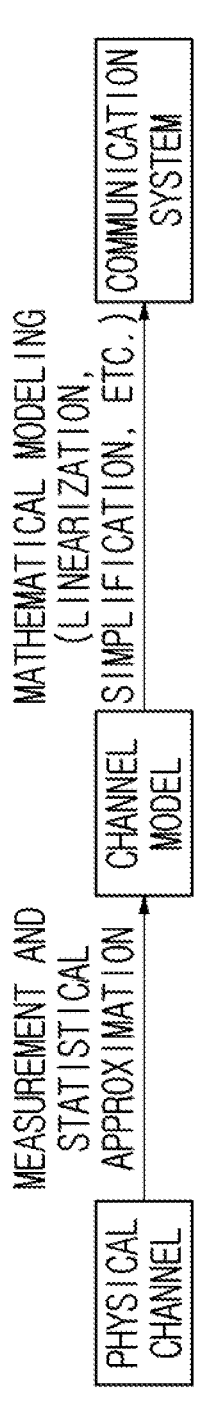
FIG. 21 schematically shows a communication system model.

FIG. 21 schematically shows a communication system model.

Referring to FIG. 21, a channel model is calculated through measurement and statistical approximation of a physical channel, and a communication system may be calculated by mathematical modeling such as linearization and simplification of the channel model.

Most communication systems are designed and optimized based on the procedure shown in FIG. 21. However, an actual physical channel and a statistical model do not exactly match, and the communication system implemented due to assumption and simplification introduced to reduce complexity does not always have optimal performance according to the changed channel environment.

In this regard, the channel model and the statistical and mathematical models of the communication system may be improved to more accurately reflect the characteristics of the actual physical channel and to have optimal performance in the actual channel environment, but it is not easy to apply the mathematical model of the communication system with increased complexity to the actual communication system.

Accordingly, a new approach is needed to implement a flexible communication system that may be optimized for the quality of service (QoS) required by various services in a channel environment to which each user belongs.

Specifically, recently, various researches to apply machine learning (ML) which has shown remarkable achievements in various fields centering on image and voice recognition, and, more particularly, deep learning (DL) technology, to communication are being conducted.

Figure 22:
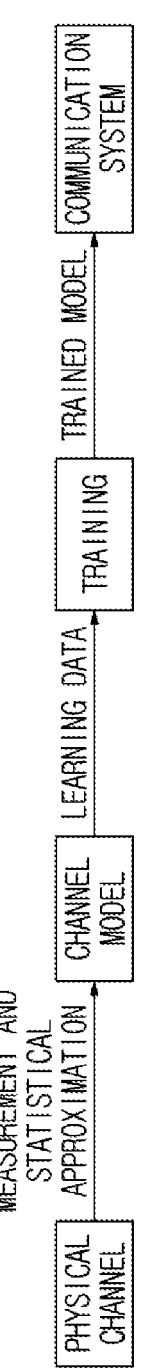
FIG. 22 schematically illustrates a machine learning-based communication system model.

FIG. 22 schematically illustrates a machine learning-based communication system model.

Referring to FIG. 22, a channel model may be calculated through measurement and statistical approximation of a physical channel, training may be performed based on learning data with respect to the channel model, and a machine learning-based communication system model may be generated based on the trained model.

Researches to apply machine learning, more particularly, deep learning, to physical layer signal processing such as channel estimation and signal detection are becoming more and more active, and researches to replace some or all of wireless communication transmission/reception with a machine learning model such as a deep neural network is becoming active. This approach may be a new alternative that can overcome the limitations of the existing communication system based on a mathematical model.

On the other hand, many machine learning algorithms, including deep learning, which are currently in the spotlight, require a large amount of learning data and high computational complexity during learning and, for this reason, training is performed on a high-capacity server or cloud and, in most cases, only inference using a model that has been trained is performed in an actual environment.

Most researches to apply machine learning, in particular, deep learning, to a communication physical layer, is performed on a server or a computer using a simulator, etc., and an approach to apply a model which has been trained is taken in an actual communication system.

However, there is a limit in that it is difficult to provide performance optimized for each user's environment and scenario without learning from an actual communication system. For example, for parameters to be optimized, an optimal value in a development environment considering various use environments and an optimal value in an actual environment may be different from each other.

Hereinafter, an actual environment optimization method of a wireless communication receiver based on machine learning will be described.

When or after a UE is shipped, a receiver model improved for each actual environment is secured by additionally training a machine learning-based receiver model installed by default through software update with learning data secured from a main actual environment of the UE. Overall performance is improved by using a trained receiver model in an actual environment in which additional learning is completed and using a basic receiver model in the other environments.

For example, performance is improved by additionally training a machine learning receiver model based on transmitted/received data in an actual channel in the main living space (e.g., home, office, a favorite coffee shop, etc.) of a smartphone user to secure an optimal receiver model for each place and switching and using a basic model and an additionally trained receiver model according to the position of the UE.

In addition, the base station may also use a receiver model which has additionally trained for the main actual environment (frequency band, place, etc.) for each UE. For a UE without an additionally trained model or a UE having a trained model but connected in an untrained environment, a basic receiver model is used.

Learning data required for additional training of the UE and base station receiver model is transmitted from a transmitter according to the procedure and method proposed in the present disclosure. Here, for example, for the additional learning, supervised learning and semi-supervised learning methods may be used in an actual environment, and technology for securing labeled data necessary for supervised learning and semi-supervised learning may be required.

Figure 23:
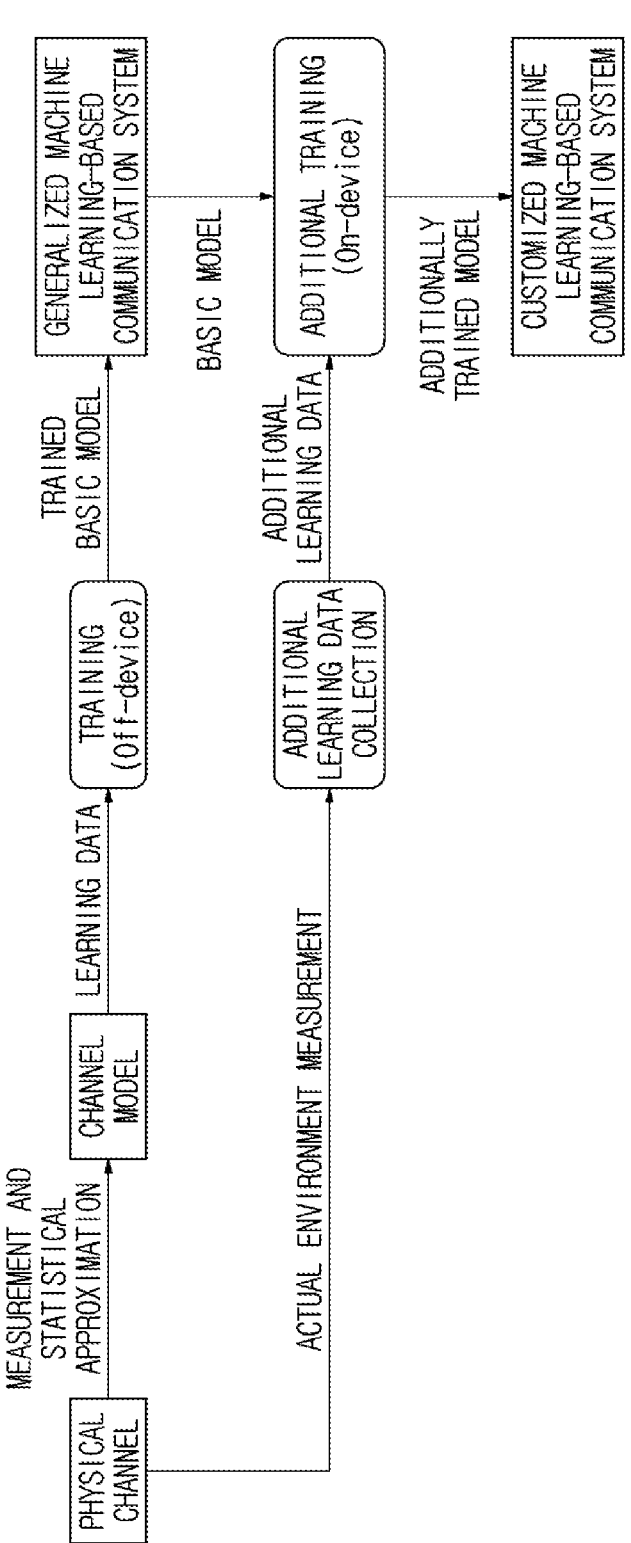
FIG. 23 schematically illustrates a machine learning-based communication system model according to some implementations of the present disclosure.

FIG. 23 schematically illustrates a machine learning-based communication system model according to some implementations of the present disclosure.

Referring to FIG. 23, a channel model may be calculated through measurement and statistical approximation of a physical channel, training may be performed based on learning data with respect to the channel model, and a machine learning-based communication system model may be generated based on the trained basic model.

Here, additional learning data may be collected by measuring an actual environment for a physical channel and additional training may be performed on a generalized machine learning-based communication system model based on the additional learning data.

In this way, the model which has been additionally trained may be used as a customized machine learning-based communication system model.

Figure 24:
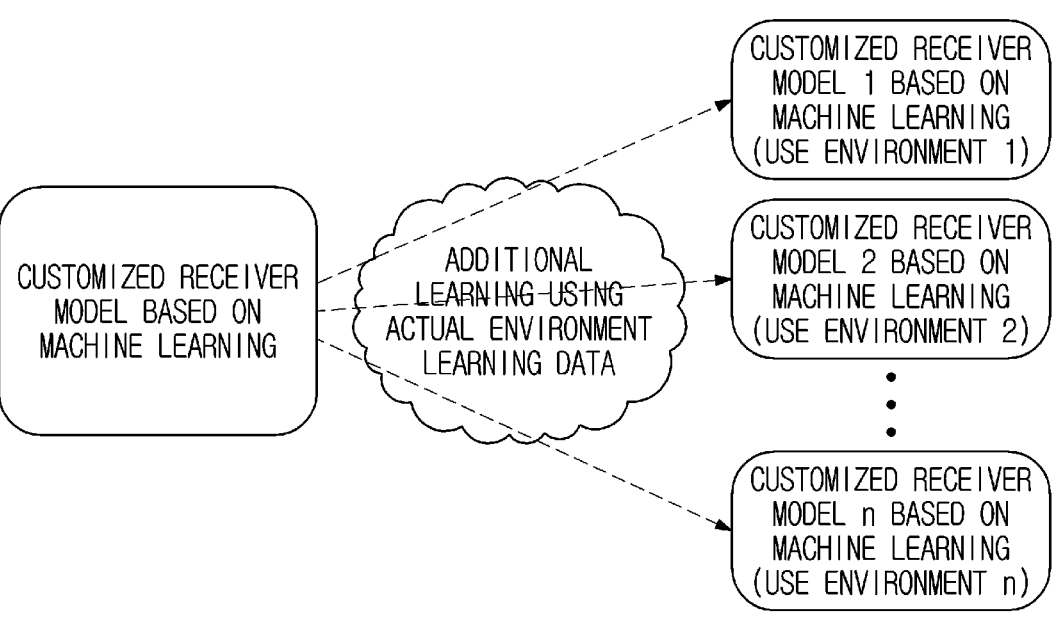
FIG. 24 illustrates an example of an actual environment optimization method of a machine learning-based communication system model for a UE, according to some implementations of the present disclosure.

FIG. 24 illustrates an example of an actual environment optimization method of a machine learning-based communication system model for a UE, according to some implementations of the present disclosure.

Referring to FIG. 24, additional learning using an actual environment training data is performed on a default receiver model based on machine learning.

Referring to FIG. 24, for example, considering a total of n different use environments, a default receiver model based on machine learning may generate a total of n different customized receiver models from a customized receiver model 1 based on machine learning for a use environment 1 to a customized receiver model n based on machine learning for a use environment n through additional learning using data according to the n different use environments.

Figure 25:
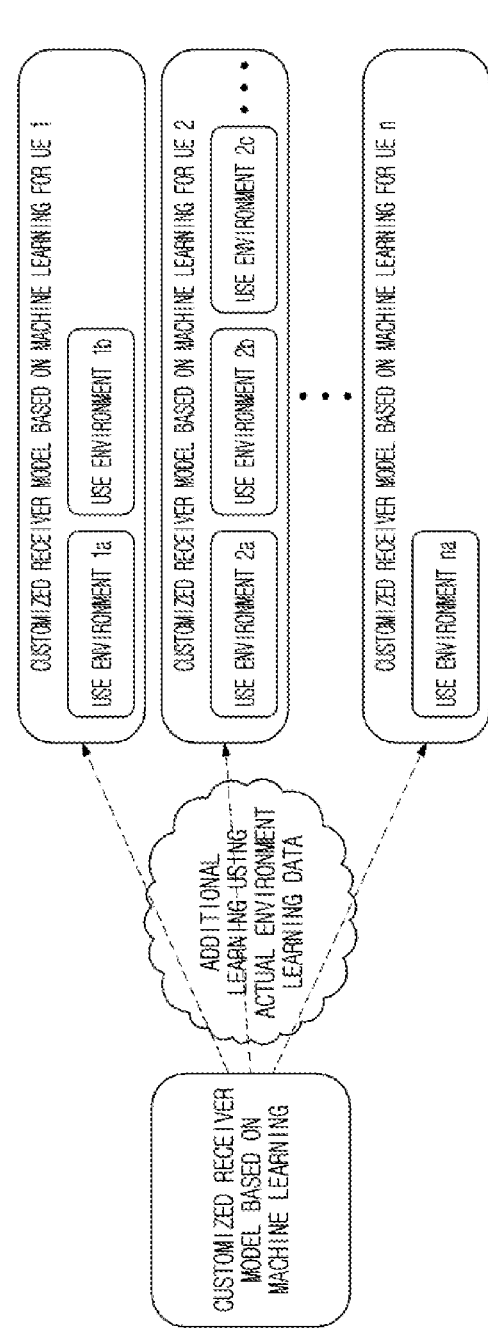
FIG. 25 illustrates an example of an actual environment optimization method of a machine learning-based communication system model for a base station, according to some implementations of the present disclosure.

FIG. 25 illustrates an example of an actual environment optimization method of a machine learning-based communication system model for a base station, according to some implementations of the present disclosure.

Referring to FIG. 25, for example, considering a total of n different UEs, a default receiver model based on machine learning of the base station may perform additional learning using actual environment data according to the n different UEs.

Here, each of the n UEs may have a machine-trained receiver model for different use environments. For example, among the n different UEs, UE 1 uses a machine-trained customized receiver model for use environment Ta and use environment Tb, and the UE n may use a machine-trained customized receiver model for use environment na.

Hereinafter, a method of transmitting whether to support an actual environment training of a wireless communication receiver based on machine learning will be described.

The base station may inform the UE whether to support the actual environment training of the machine learning receiver model through system information, and the UE may inform the base station whether to support the actual environment training of the machine learning receiver model through UE capability information. The method may support both or one of uplink and downlink.

Figure 26:
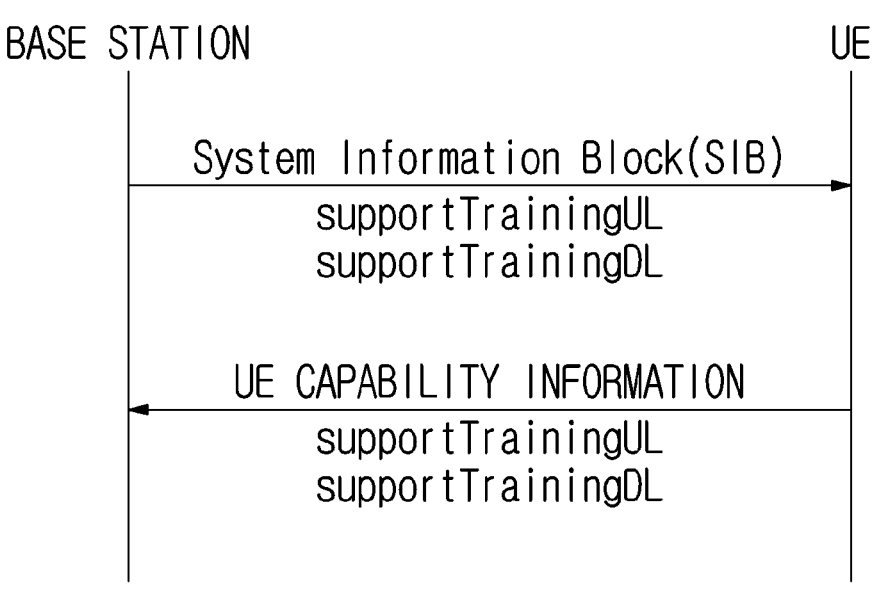
FIG. 26 schematically illustrates an example of implementing a method of transmitting whether to support actual environment training of a machine learning-based wireless communication receiver.

FIG. 26 schematically illustrates an example of implementing a method of transmitting whether to support actual environment training of a machine learning-based wireless communication receiver.

Referring to FIG. 26, the baes station may inform the UE whether to support actual environment training of the wireless communication receiver based on machine learning of the UE through system information. In contrast, the UE may inform the base station whether to support actual environment training of the wireless communication receiver based on machine learning of the base station through UE capability information.

Here, each of the system information and the UE capability information may include an information element (IE) informing whether to support actual environment training of the wireless communication receiver based on machine learning. For example, supportTrainingUL may inform whether to support actual environment training of the wireless communication receiver based on machine learning for uplink, and supportTrainingDL may inform whether to support actual environment training of the wireless communication receiver based on machine learning for downlink. Each of the information elements may have a value of true or false.

Hereinafter, a method of obtaining learning data of a machine learning-based receiver for downlink will be described.

When the UE enters a communication environment to be optimized through additional learning, if all of the following conditions are satisfied, the UE may activate a forward learning data acquisition mode and request transmission of learning data from the base station through L3 (e.g., RRC) or L2 (e.g., MAC) signaling.

(Condition 1-1) there is no model optimized through additional learning in the basic model for the communication environment.

(Condition 1-2) there is no learning in progress using learning data obtained previously.

(Condition 1-3) the UE is being charged or the remaining battery level of the UE is equal to or higher than a predetermined learning data acquisition level.

The UE may transmit all or part of the following information to the base station before activation of a downlink learning data acquisition mode or together with transmission of an activation message.

(Information 1-1) A minimum time difference between L1 signaling such as DCI indicating learning data transmission information from the base station to the UE and learning data transmission. Here, the minimum time difference may be a minimum preparation time required for the UE to acquire learning data.

(Information 1-2) Statistical distribution and parameters of learning data transmission interval. This may be to secure learning data in temporally and spatially various channel environments. Meanwhile, here, information 2 may include information on a transmission period, a minimum interval and/or maximum interval for a uniform distribution, an average, standard deviation and minimum interval for a Gaussian distribution, etc.

(Information 1-3) Resource information allocable to learning data transmission. For example, power boosting information, the number of resource blocks and symbols, etc. may be included. Specifically, the power boosting information may be necessary to perform learning in various SNR (signal-to-noise ratio) environments. In addition, the number of resource blocks or symbols may be information on a maximum value or a minimum value.

(Information 1-4) learning data generation method.

The UE in which the learning data acquisition mode is activated may deactivate the downlink learning data acquisition mode and inform the base station of it through L3 (e.g., RRC) or L2 (e.g., MAC) signaling, when one of the following conditions is satisfied.

(Condition 2-1) it deviates from a communication environment to be optimized.

(Condition 2-2) The remaining battery level is less than the predetermined learning data acquisition level in a state in which charging is not performed.

(Condition 2-3) All data required for learning are secured.

On the other hand, the base station may transmit learning data to the UE using information received from the UE while the learning data acquisition mode is activated in the UE.

Here, the base station may randomly allocate radio resource to have a uniform distribution in the frequency domain such that the UE secures learning data with respect to all frequency components of a frequency band to be learned. In addition, here, the base station may transmit a time interval according to the distribution requested by the UE such that the UE secures learning data in temporally or spatially various channel environments. In addition, here, the base station may randomize the transmitted learning data using UE information (identifier (ID) such as IMSI (International Mobile Subscriber Identity) or IMEI (International Mobile Equipment Identity), cell information (cell ID, etc.), time information, etc. In addition, here, the base station may inform the UE of learning data using L1 signaling information such as DCI.

Meanwhile, the UE may store, in an internal storage device, related information necessary for learning together with a received signal of data specified for learning by DCI, etc. In this case, the UE may store not only learning data but also information related to the received signal of user data for learning according to capability thereof and use it for learning.

Figure 27:
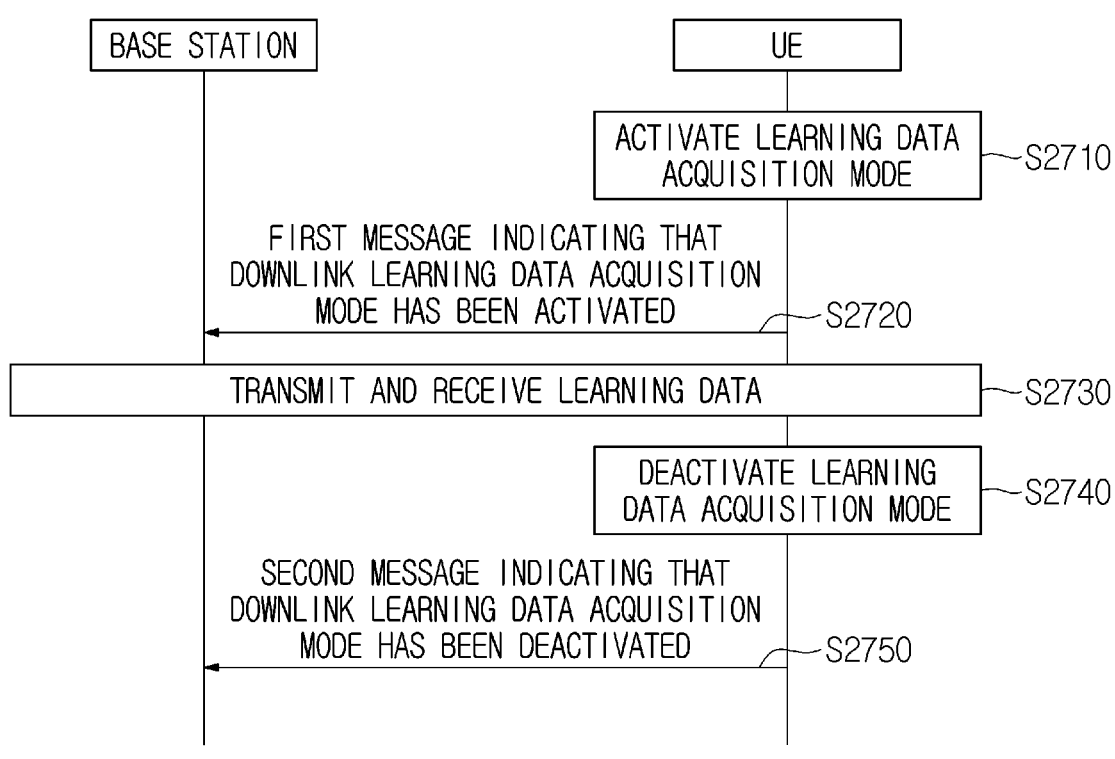
FIG. 27 is a flowchart illustrating an example of downlink learning data acquisition.

FIG. 27 is a flowchart illustrating an example of downlink learning data acquisition.

According to FIG. 27, a UE activates a learning data acquisition mode (S2710).

Thereafter, the UE transmits a first message indicating that the downlink learning data acquisition mode has been activated to the base station (S2720). Step S2720 may be replaced with operation in which the UE requests transmission of downlink learning data from the base station or they may be simultaneously performed. For example, when the UE requests transmission of the downlink learning data from the base station, the base station may implicitly recognize that the UE has entered the downlink learning data acquisition mode.

Thereafter, the base station and the UE perform learning data transmission and reception operation (S2730). For example, the base station may transmit the downlink learning data to the UE, and the UE may receive the data.

Thereafter, the UE may deactivate the learning data acquisition mode (S2740). Here, for example, when at least one of Condition 2-1 to Condition 2-3 above is satisfied, the UE may deactivate the learning data acquisition mode.

Thereafter, the UE transmits, to the base station, a second message indicating that the downlink learning data acquisition mode has been deactivated (S2750).

Figure 28:
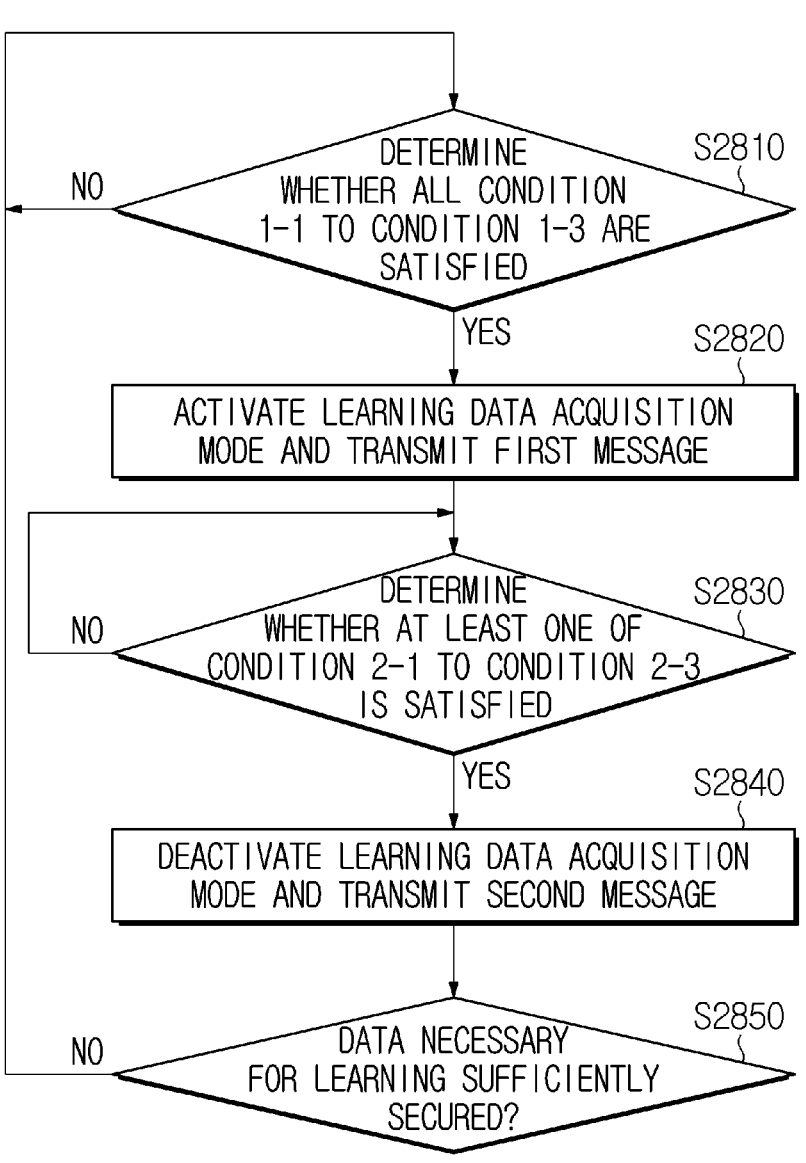
FIG. 28 is a flowchart illustrating an example of activation and deactivation of the learning data acquisition mode of the UE.

FIG. 28 is a flowchart illustrating an example of activation and deactivation of the learning data acquisition mode of the UE.

The UE determines whether all of Condition 1-1 to Condition 1-3 above are satisfied (S2810). Here, when at least one of Conditions 1-1 to 1-3 above is not satisfied, the UE returns to step S2810.

When all Condition 1-1 to Condition 1-3 above are satisfied, the UE activates the learning data acquisition mode and transmits, to the base station, a first message indicating that the downlink learning data acquisition mode has been activated (S2820).

Thereafter, the UE determines whether at least one of Condition 2-1 to Condition 2-3 above is satisfied (S2830). Here, when all Condition 2-1 to Condition 2-3 above are not satisfied, the UE returns to step S2830.

When at least one of Condition 2-1 to Condition 2-3 above is satisfied, the UE deactivates the learning data acquisition mode and transmits, to the base station, a second message indicating that the downlink learning data acquisition mode has been deactivated (S2840).

Thereafter, the UE determines whether data necessary for learning is sufficiently secured (S2850). Here, when the UE determines that the data necessary for learning is not sufficiently secured, the UE returns to step S2810. In addition, here, when the UE determines that the data necessary for learning is sufficiently secured, the UE performs learning based on the data.

Hereinafter, a learning data acquisition method of a machine learning based receiver for uplink will be described.

When the UE enters a communication environment to be optimized through additional learning, the base station activates an uplink learning data acquisition mode if all of the following conditions are satisfied.

(Condition 3-1) there is no model optimized through additional learning in a basic model for the communication environment.

(Condition 3-2) there is no learning in progress using learning data obtained previously.

The base station may deactivate the uplink learning data acquisition mode when at least one of the following conditions is satisfied.

(Condition 4-1) The UE deviates from a communication environment to be optimized.

(Condition 4-2) All data necessary for learning is secured.

The base station may allocate uplink resource to the UE to transmit learning data in a state in which the uplink learning data acquisition mode is activated.

For example, the base station may request learning data transmission from the UE together with a learning data generation method selected by the base station using L1 signaling such as DCI. In addition, for example, the base station may randomly allocate radio resource to have a uniform distribution in the frequency domain such that learning data is secured with respect to all frequency components of a frequency band to be learned. In addition, for example, the base station may randomize a time interval to secure learning data in temporally or spatially various channel environments. In addition, for example, the UE may randomize data transmitted according to the rule promised with the base station using UE information (e.g., ID such as IMSI), cell information (e.g., cell ID, etc.), time information, etc. In addition, here, learning data may not be transmitted when the remaining battery level is less than the predetermined learning data acquisition level in a state in which charging is not performed. In this case, when the UE does not transmit learning data, the base station shall recognize it.

Meanwhile, the base station may store, in an internal storage device, related information necessary for learning together with a received signal whenever learning data is received. Here, the base station may store not only learning data but also received signal of user data and related information according to capability thereof and use them for learning.

Meanwhile, the base station may inform the UE of activation/deactivation of the learning data acquisition mode through L3 (e.g., RRC) or L2 (e.g., MAC) signaling. Here, the base station may send an uplink learning data acquisition mode activation message to the UE at any time in a state in which the learning data acquisition mode is activated. In addition, here, after the base station transmits, to the UE, the uplink learning data acquisition mode activation message, when the learning data acquisition mode is deactivated, the base station shall transmit, to the UE, an uplink learning data acquisition mode deactivation message.

Meanwhile, when the UE receives the uplink learning data acquisition mode activation message, the UE informs the base station whether it is a state capable of transmitting learning data or not through L3 (e.g., RRC) or L2 (e.g., MAC) signaling, and informs the base station of a changed state when the state is changed. The case where the UE is being charged or the case where the remaining battery level is greater than or equal to the predetermined learning data acquisition level may be a state capable of transmitting learning data. When the UE receives the uplink learning data acquisition mode deactivation message, whether leaning data is able to be transmitted may not be transmitted to the base station. Here, when the UE moves from a cell in which the uplink learning data acquisition mode activation message has been received to another cell by handover or a cell selection procedure, it may be regarded as having received the uplink learning data acquisition mode deactivation message.

Meanwhile, since, only in a state in which the UE is capable of transmitting learning data, the base station may allocate radio resource to the UE, whether the base station informs the UE of activation/deactivation of the learning data acquisition mode and whether the UE informs the base station whether learning data is able to be transmitted may be determined by the base station.

Figure 29:
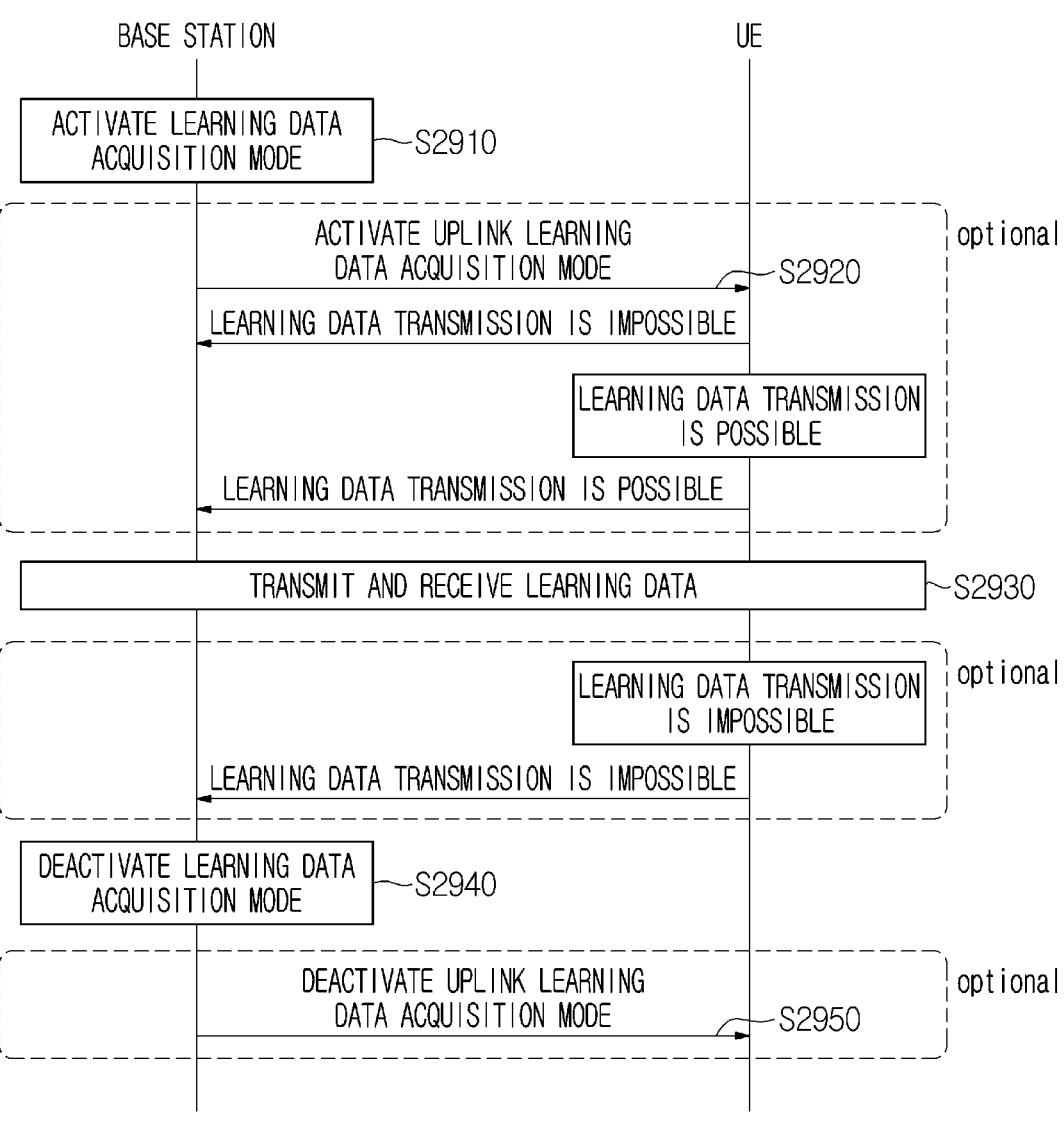
FIG. 29 is a flowchart illustrating an example of uplink learning data acquisition.

FIG. 29 is a flowchart illustrating an example of uplink learning data acquisition.

Referring to FIG. 29, the base station activates the learning data acquisition mode (S2910).

Thereafter, the base station transmits a first message indicating that the uplink learning data acquisition mode has been activated to the UE (S2920). Here, when the UE is not able to transmit learning data, the UE may inform the base station that the learning data is not able to be transmitted. In addition, here, when the UE is able to transmit the learning data, the UE may inform the base station that the learning data is able to be transmitted.

Thereafter, the base station and the UE perform learning data transmission and reception operation (S2930).

Thereafter, when the UE is not able to transmit the learning data, the UE may inform the base station that the learning data is not able to be transmitted.

Meanwhile, the base station deactivates the learning data acquisition mode (S2940).

Thereafter, the base station transmits, to the UE, a second message indicating that the uplink learning data acquisition mode has been deactivated (S2950).

Meanwhile, in FIG. 29, UE operation of informing that the UE is able to transmit the learning data and the UE is not able to transmit the learning data may be optional. In addition, operation in which the base station transmits the first message and the base station transmits the second message may be optional.

Figure 30:
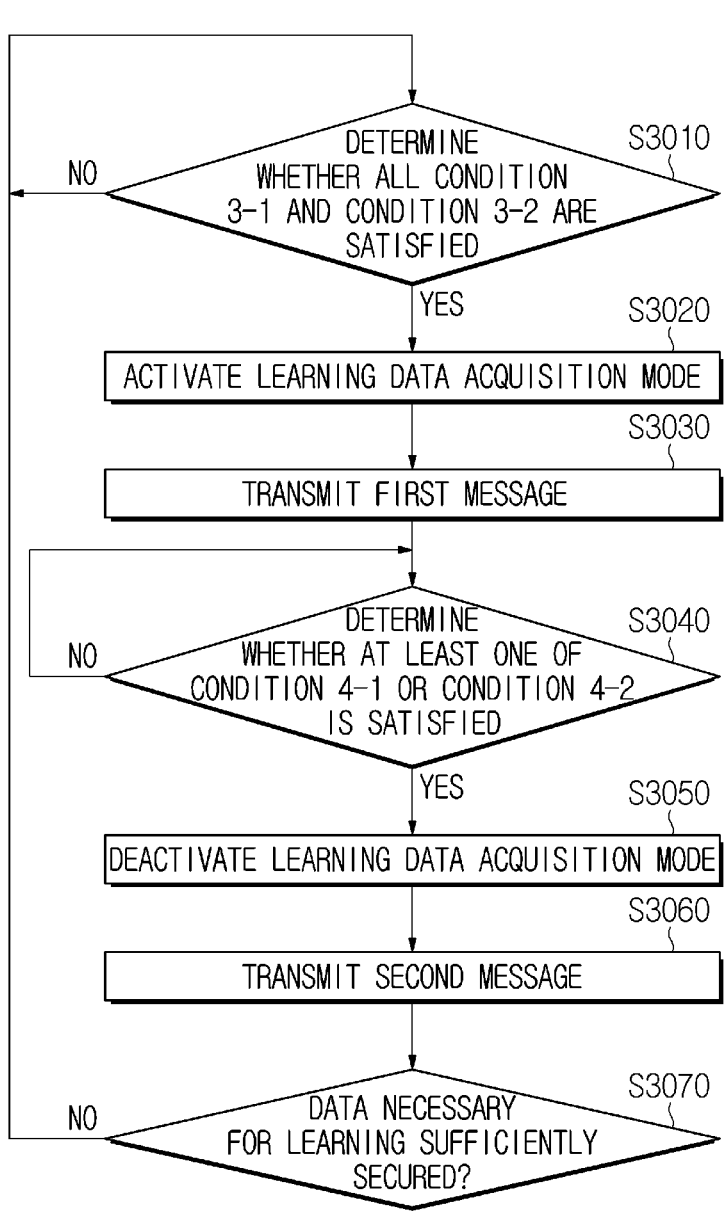
FIG. 30 is a flowchart illustrating an example of activation and deactivation of the learning data acquisition mode of the base station.

FIG. 30 is a flowchart illustrating an example of activation and deactivation of the learning data acquisition mode of the base station.

Referring to FIG. 30, the base station determines whether both Condition 3-1 and Condition 3-2 above are satisfied (S3010). Here, for example, when at least one of Condition 3-1 or Condition 3-2 is not satisfied, the base station returns to step S3010.

When both Condition 3-1 and Condition 3-2 above are satisfied, the base station activates the learning data acquisition mode (S3020). Thereafter, the base station transmits a first message indicating that the learning data acquisition mode has been activated to the UE (S3030).

Thereafter, the base station determines whether at least one of Condition 4-1 or Condition 4-2 above is satisfied (S3040). Here, for example, when both Condition 4-1 and Condition 4-2 above are not satisfied, the base station returns to step S3040.

When at least one of Condition 4-1 or Condition 4-2 above is satisfied, the base station deactivates the learning data acquisition mode (S3050). Thereafter, the base station transmits a second message indicating that the learning data acquisition mode has been deactivated to the UE (S3060).

Thereafter, the base station determines whether data necessary for learning is sufficiently secured (S3070). Here, for example, when the base station determines that data necessary for learning is not sufficiently secured, the base station returns to step S3010. In addition, here, when the base station determines that data necessary for learning is sufficiently secured, the base station performs learning based on the data.

Meanwhile, referring to FIG. 30, each of step S3030 and step S3060 may be optional.

Hereinafter, a learning data generation and receiver training method will be described.

The learning data transmitted by the base station and/or the UE may be generated based on a first method of generating it by including all transmitter functions from channel coding in the same way as general user data or a second method of generating it using only transmitter functions after modulation without including channel coding.

Figure 31:
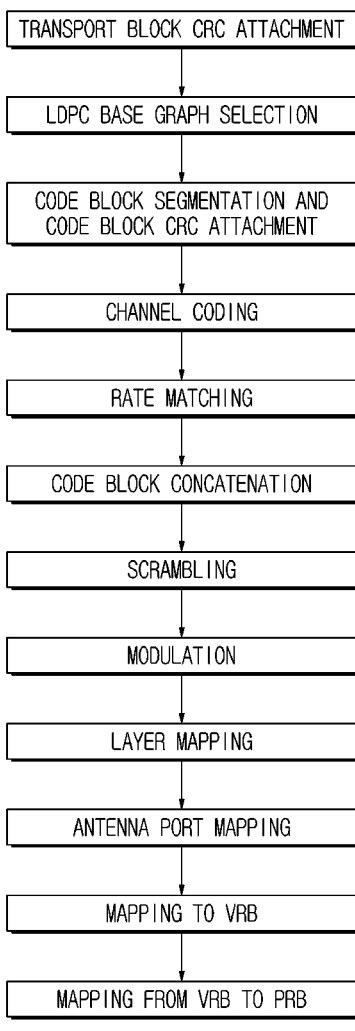
FIG. 31 illustrates a learning data generation method according to some implementation of the present disclosure.

FIG. 31 illustrates a learning data generation method according to some implementation of the present disclosure.

Referring to FIG. 31, data may be transmitted through a transport block CRC attachment step, LDPC base graph selection step, code block segmentation and code block CRC attachment step, channel coding step, rate matching step, code block concatenation step, scrambling step, modulation step, layer mapping step, antenna port mapping step, mapping step to VRB and mapping step from VRB to PRB.

Here, according to the first method, the learning data generated by the base station or the UE may be transmitted through all the above-described steps. Alternatively, according to the second method, the learning data generated by the base station or the UE may be transmitted through modulation step, layer mapping step, antenna port mapping step, mapping step to VRB and mapping step from VRB to PRB.

Meanwhile, the learning data generation method may be transmitted from a receiver to a transmitter based on the below-described method.

In the case of downlink, the UE may transmit, to the base station, a selected method through the learning data acquisition mode activation message (e.g., the first message of FIGS. 27 and 28). In the case of uplink, the base station may transmit, to the UE, the learning data acquisition mode activation message (e.g., the first message of FIGS. 29 and 30) or L1 signaling such as DCI.

Meanwhile, as a method of applying machine learning technology to a wireless communication receiver, two approaches may be considered: implementing all operation including demodulation and channel decoding as one machine learning model and applying machine learning technology to some of functional blocks. However, in consideration of the generalization problem described later, a method of applying deep learning of a wireless communication receiver model only to a demodulation step or a demodulator may be characteristically considered.

Specifically, the demodulator may recover bitwise data from an estimated symbol. In case of learning data, since data actually transmitted from the transmitter is known, a deep learning-based demodulator may be trained (for example, supervised learning) with an algorithm such as SGD (Stochastic Gradient Descent) from an error with the estimated data, that is, a loss function.

The bitwise data estimated in the demodulator is transmitted to a channel decoder through descrambling. In a channel decoding method, performance is generally improved using a soft decision value such as LLR (Log-Likelihood Ratio) rather than using a hard decision value such as 0 and 1 as input. In general, in a deep learning model for solving a classification problem, a probability of each class is calculated and a class having a highest probability is selected. For example, when the demodulator is implemented by a deep neural network, probabilities for all possible symbols are obtained using an activation function of a neural network output layer as a SoftMax function and a symbol having a highest probability may be estimated. Accordingly, soft decision values transmitted to the channel decoder may be obtained when the probability values of the symbols are used.

However, since it may not be easy to train the demodulator to estimate the soft decision value capable of obtaining optimal channel decoding performance using a learning method using only an error between a correct answer (label) and an estimated value, a demodulator learning method using regularization may be considered.

Specifically, one of important problems of machine learning is a generalization problem of how to secure desired performance even on data not used for learning for a given problem. Even if training error increases, machine learning methods used for the purpose of reducing test error or generalization error are collectively called regularization.

As a regularization technique in deep learning, weight decay or $L^2$ regularization may be considered. In this method, together with a difference between the correct answer and the estimated value, a value obtained by adding the squares of all weight values of the deep neural network is used as a loss function. For example, when cross entropy is used as the difference between the correct answer and the estimated value, the loss function may be expressed by the sum of cross entropy and the value obtained by multiplying the sum of the squares of all weight values by a weight (that is, loss function=cross entropy+weight*(sum of squares of all weight values).

When the loss function defined in this way is minimized, the weight values have a uniform distribution to use all input information evenly, thereby reducing overfitting and improving generalization characteristics.

Furthermore, the demodulator may be trained to obtain a soft decision value capable of obtaining optimal performance by combination with channel decoding by adding a regularization term using a bit error ratio (BER) after channel decoding to a loss function for training a deep learning-based modulator. That is, it may be loss function=cross entropy+weight*BER. In addition, an existing regularization technique such as weight decay may be used together.

Meanwhile, since the BER may be obtained by completing channel decoding, a mini-batch size for learning may be a codeword or code block unit. Here, when the boundary of the code block unit is not clear in the symbol unit, a mini-batch size may be set to a multiple of the codeword. When actual learning data is transmitted, since the size of the transmitted codeword and the number of symbols may vary depending on available radio resource, a coding rate, etc., the number of symbols for each mini-batch may not be constant. The number of codewords or code blocks included in each mini-batch needs to be adjusted such that the number of symbols of each mini-batch for demodulator training is similar.

Figure 32:
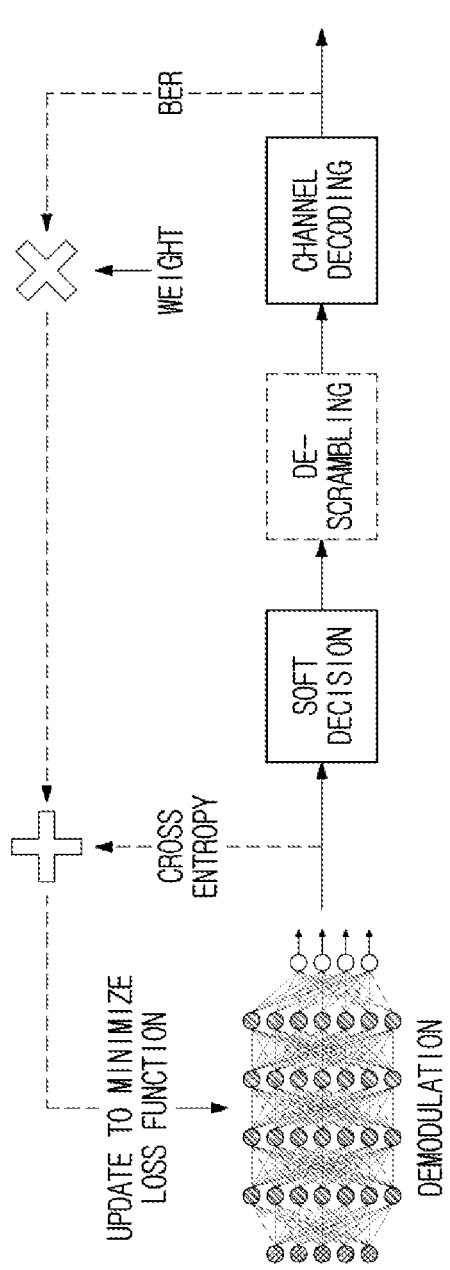
FIG. 32 illustrates a receiver learning method according to some implementations of the present disclosure.

FIG. 32 illustrates a receiver learning method according to some implementations of the present disclosure.

Referring to FIG. 32, when data is demodulated based on a demodulator implemented by a deep neural network, a soft decision value may be obtained and then channel decoding may be performed through descrambling.

Here, as described above, after deriving a weight by deriving a BER value from a result of channel decoding, a loss function may be derived through a adding result using a difference between an estimated value and a correct answer (label) as cross entropy. A machine-learned demodulator may be updated to minimize an error value based on the derived loss function.

On the other hand, a receiver may select a learning data generation method. As a specific example, when the receiver wants to additionally learn only a demodulator using actual environment data, if a hard decision value is transmitted from the demodulator to the channel decoder or if a soft decision value may be optimized without channel coding or does not need to be optimized, a second method of generating it using only a transmission function after modulation without including channel coding may be selected and, in the other cases, a first method which is equal to the general data generation method may be selected.

Figure 33:
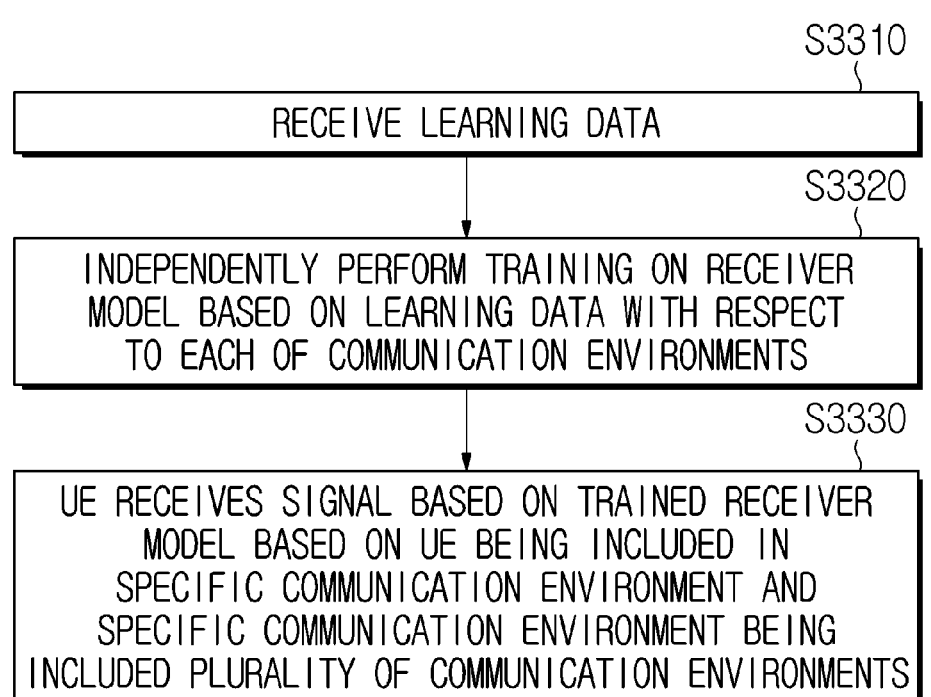
FIG. 33 is a flowchart of an example of a signal reception method of a UE according to some implementations of the present disclosure.

FIG. 33 is a flowchart of an example of a signal reception method of a UE according to some implementations of the present disclosure.

Referring to FIG. 33, the UE receives learning data (S3310).

Hereinafter, the UE performs training on a receiver model based on the learning data (S3320). Here, the training may be independently performed on each of a plurality of communication environments.

Thereafter, based on the UE being included in a specific communication environment and the specific communication environment being included in the plurality of communication environments, the UE receives a signal based on the trained receiver model (S3330). Here, based on the UE being included in a specific communication environment and the specific communication environment being not included in the plurality of communication environments, the UE receives a signal based on the untrained receiver model.

The claims described herein may be combined in various ways. For example, the technical features of the method claims of the present specification are combined and implemented as an apparatus, and the technical features of the apparatus claims of the present specification are combined and implemented as a method. In addition, the technical features of the method claim and the technical features of the apparatus claim of the present specification are combined to be implemented as an apparatus, and the technical features of the method claim and the technical features of the apparatus claim of the present specification are combined and implemented as a method.

The methods proposed in the present specification may be performed by an apparatus including at least one computer-readable recording medium including an instruction based on being executed by at least one processor, one or more processors and one or more memories operably coupled by the one or more processors and configured to store instructions, wherein the one or more processors execute the instructions to perform the methods proposed herein and configured to control a UE, in addition to the UE. In addition, it is obvious that, according to the methods proposed in the present specification, an operation by the base station corresponding to the operation performed by the UE may be considered.

Hereinafter, an example of a communication system to which the present disclosure is applied will be described.

Although not limited thereto, the various descriptions, functions, procedures, suggestions, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 34:
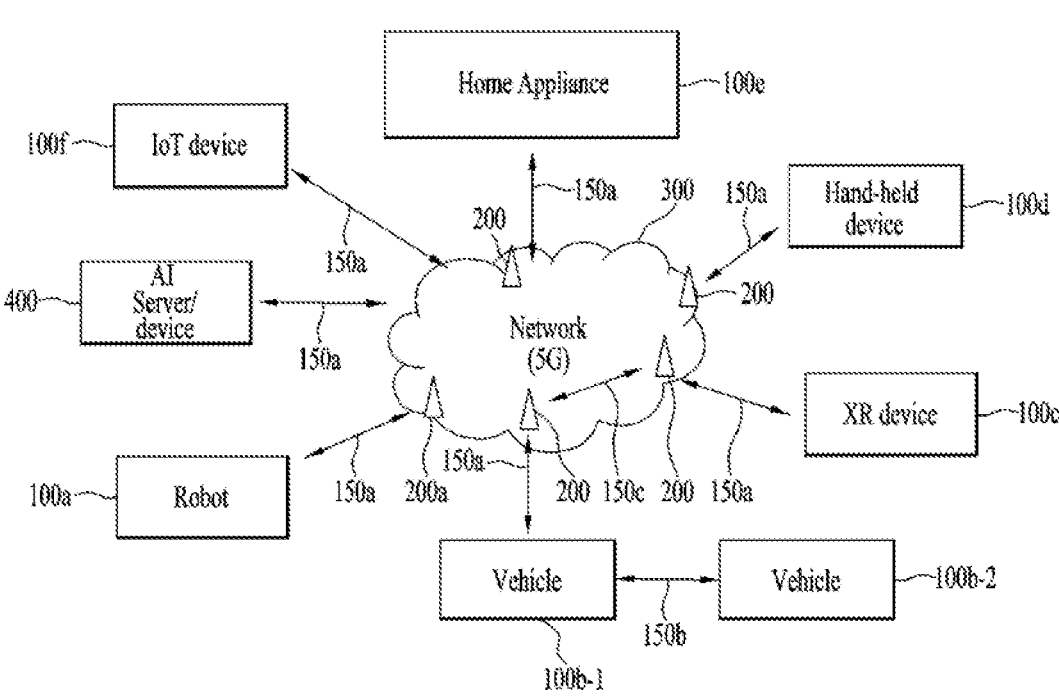
FIG. 34 shows a communication system (1), in accordance with an embodiment of the present disclosure.

FIG. 34 shows a communication system (1) in accordance with an embodiment of the present disclosure.

Referring to FIG. 34, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/ server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/ Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/down-link communication (150a), sidelink communication (150b)

(or, D2D communication), or inter BS communication (e.g. relay, Integrated Access Backhaul (IAB)). The wireless devices and the BSs/the wireless devices may transmit/receive radio signals to/from each other through the wireless communication/connections (150*a*, 150*b*). For example, the wireless communication/connections (150*a*, 150*b*) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 35:
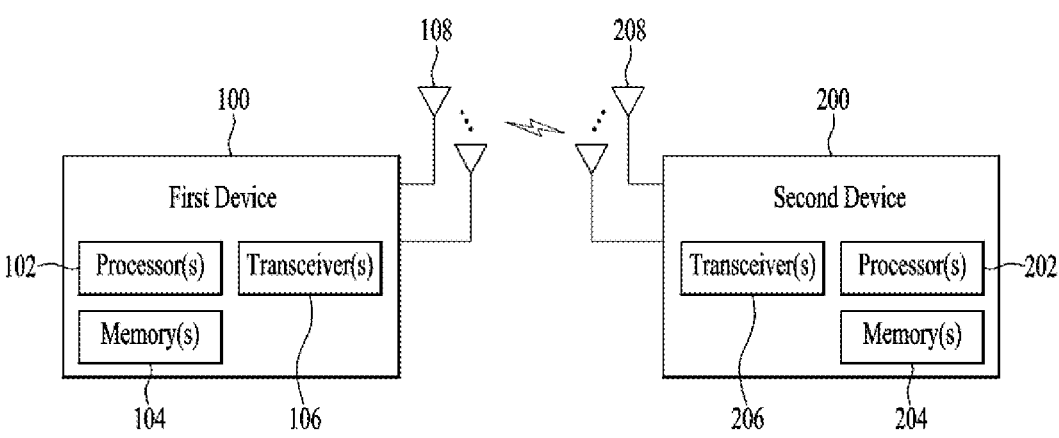
FIG. 35 shows wireless devices, in accordance with an embodiment of the present disclosure.

FIG. 35 shows wireless devices in accordance with an embodiment of the present disclosure.

Referring to FIG. 35, a first wireless device (100) and a second wireless device (200) may transmit radio signals through various RATs (e.g., LTE and NR). Herein, {the first wireless device (100) and the second wireless device (200)} may correspond to {the wireless device (100*x*) and the BS (200)} and/or {the wireless device (100*x*) and the wireless device (100*x*)} of FIG. 34.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/ signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 36:
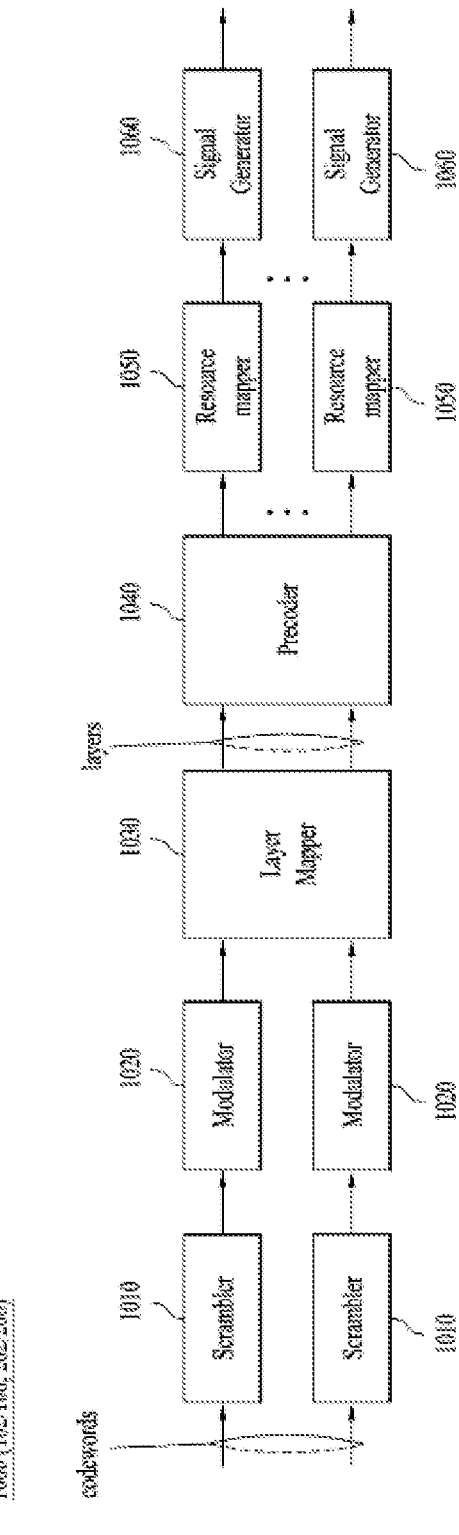
FIG. 36 shows a signal process circuit for a transmission signal, in accordance with an embodiment of the present disclosure.

FIG. 36 shows a signal process circuit for a transmission signal in accordance with an embodiment of the present disclosure.

Referring to FIG. 36, a signal processing circuit (1000) may include scramblers (1010), modulators (1020), a layer mapper (1030), a precoder (1040), resource mappers (1050), and signal generators (1060). An operation/function of FIG. 36 may be performed, without being limited to, the processors (102, 202) and/or the transceivers (106, 206) of FIG. 35. Hardware elements of FIG. 36 may be implemented by the processors (102, 202) and/or the transceivers (106, 206) of FIG. 35. For example, blocks 1010~1060 may be implemented by the processors (102, 202) of FIG. 35. Alternatively, the blocks 1010~1050 may be implemented by the processors (102, 202) of FIG. 35 and the block 1060 may be implemented by the transceivers (106, 206) of FIG. 35.

Codewords may be converted into radio signals via the signal processing circuit (1000) of FIG. 35. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 36. For example, the wireless devices (e.g., 100, 200 of FIG. 35) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 37 shows another example of a wireless device in accordance with an embodiment of the present disclosure. The wireless device may be implemented in various forms according to a use-case/service (refer to FIG. 34).

Referring to FIG. 37, wireless devices (100, 200) may correspond to the wireless devices (100, 200) of FIG. 35 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 35. For example, the transceiver(s) (114) may include the one or more transceivers (106, 206) and/or the one or more antennas (108, 208) of FIG. 35. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 34), the vehicles (100b-1 and 100b-2 of FIG. 34), the XR device (100c of FIG. 34), the hand-held device (100d of FIG. 34), the home appliance (100e of FIG. 34), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 34), a network node, etc. The wireless device may be used in a mobile or fixed place according to a use-example/service.

In FIG. 37, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor.

As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 37 will be described in detail with reference to the drawings.

Figure 38:
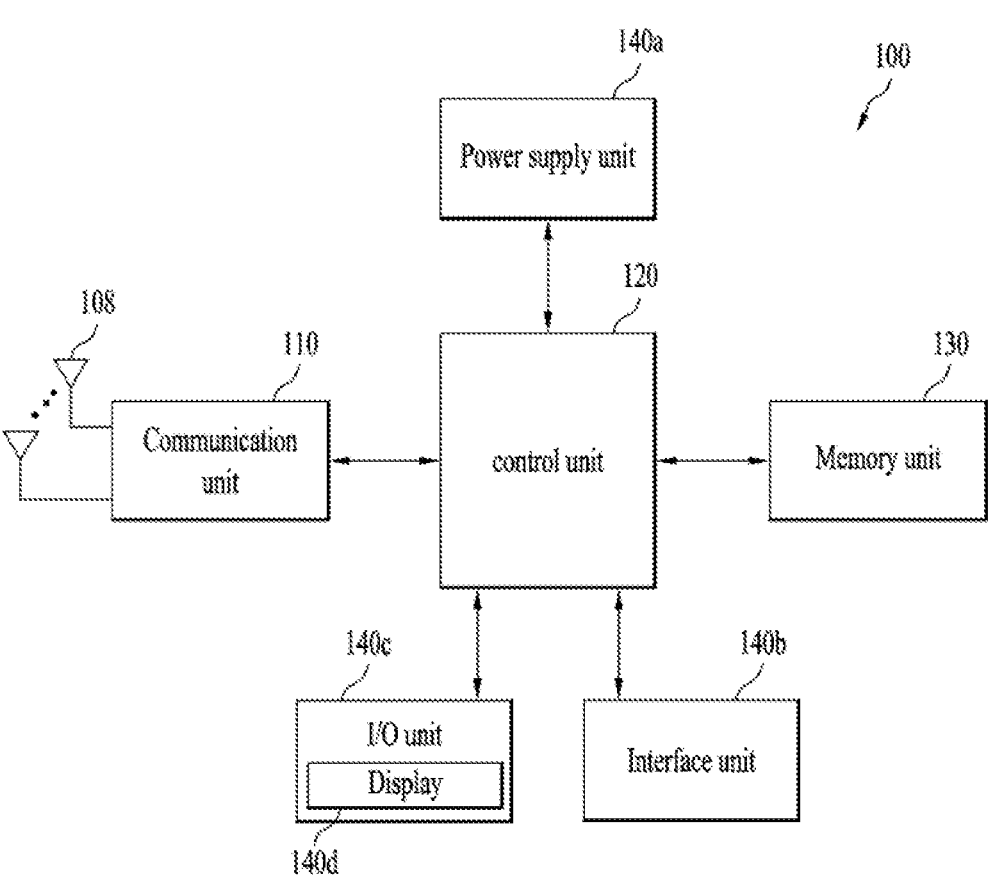
FIG. 38 shows a hand-held device, in accordance with an embodiment of the present disclosure.

FIG. 38 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 38, a hand-held device (100) may include an antenna unit (108), a communication unit (110), a control unit (120), a memory unit (130), a power supply unit (140a), an interface unit (140b), and an I/O unit (140c). The antenna unit (108) may be configured as apart of the communication unit (110). Blocks 110~130/140a~140c correspond to the blocks 110~130/140 of FIG. 29, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 39:
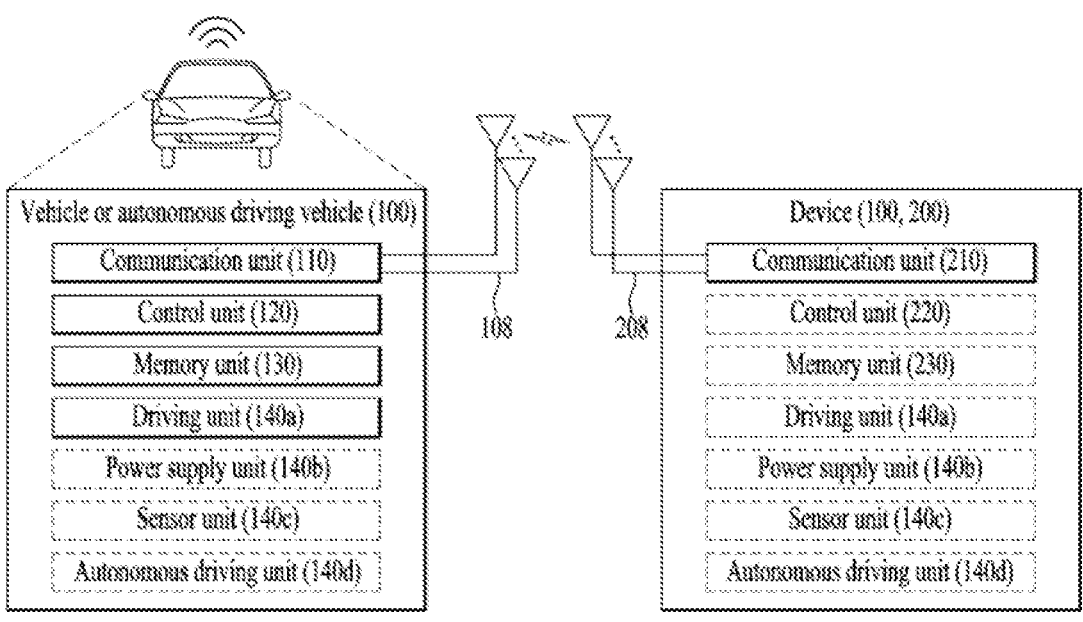
FIG. 39 shows a vehicle or an autonomous vehicle, in accordance with an embodiment of the present disclosure.

FIG. 39 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 39, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 37, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

FIG. 40 shows a vehicle in accordance with an embodiment of the present disclosure. The vehicle may be implemented as a transport means, an aerial vehicle, a ship, etc.

Referring to FIG. 40, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 37.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 41:
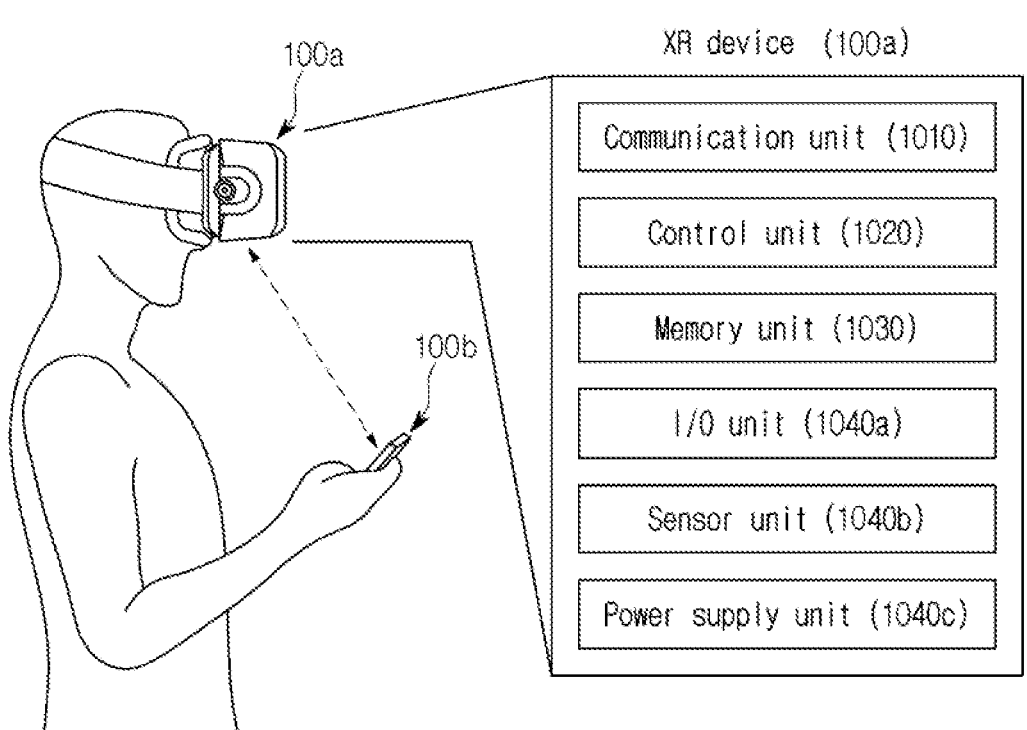
FIG. 41 shows an XR device, in accordance with an embodiment of the present disclosure.

FIG. 41 shows an XR device in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 41, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 37, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/ image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 42:
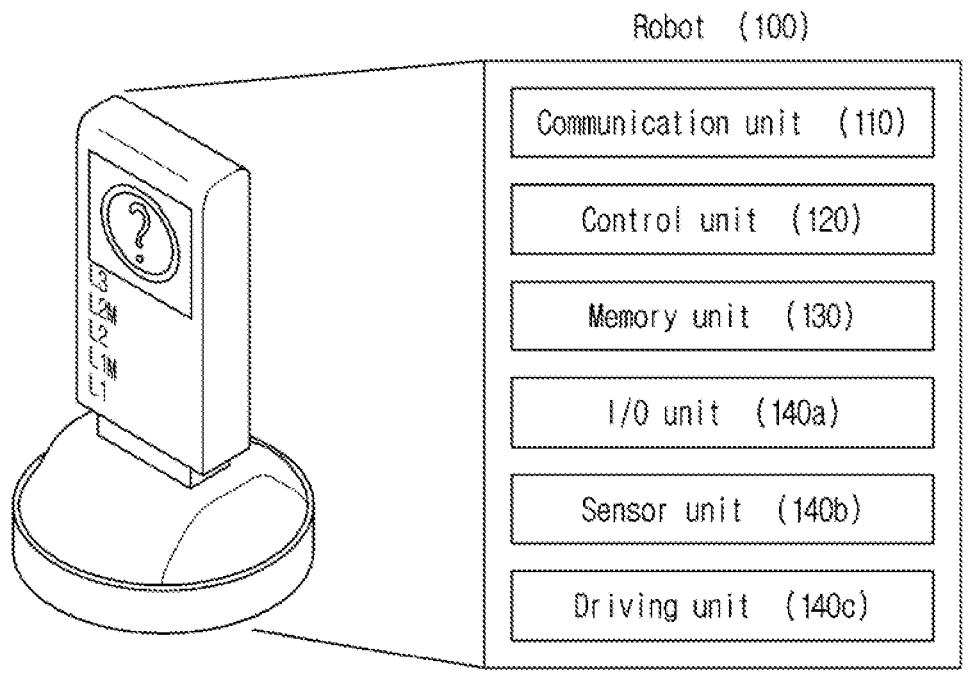
FIG. 42 shows a robot, in accordance with an embodiment of the present disclosure.

FIG. 42 shows a robot in accordance with an embodiment of the present disclosure. The robot may be categorized into an industrial robot, a medical robot, a household robot, a military robot, etc., according to a used purpose or field.

Referring to FIG. 42, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 37, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 43:
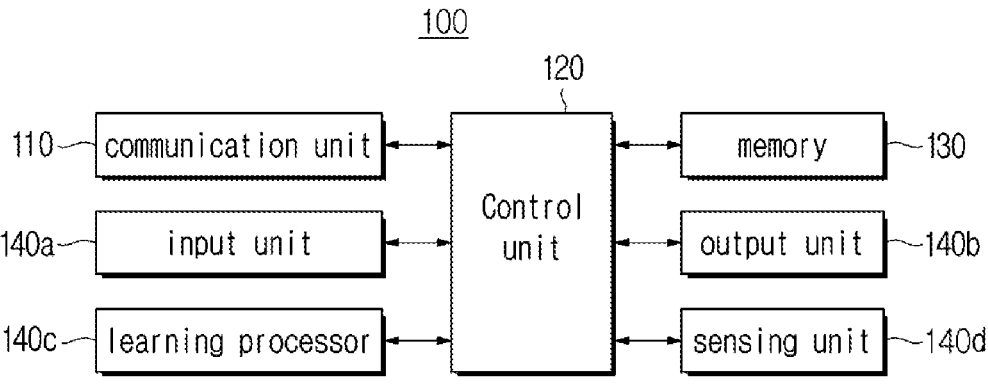
FIG. 43 shows an AI device, in accordance with an embodiment of the present disclosure.

FIG. 43 shows an AI device in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 43, an AI device (100) may include a communication unit (110), a control unit (120), a memory unit (130), an I/O unit (140a/140b), a learning processor unit (140c), and a sensor unit (140d). The blocks 110~130/ 140a~140d correspond to blocks 110~130/140 of FIG. 37, respectively.

The communication unit (110) may transmit and receive wired/radio signals (e.g., sensor information, user input, learning models, or control signals) to and from external devices such as other AI devices (e.g., 100x, 200, or 400 of FIG. 34) or an AI server (e.g., 400 of FIG. 34) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 26). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140*c*) may learn a model consisting of artificial neural networks, using learning data. The learning processor unit (140*c*) may perform AI processing together with the learning processor unit of the AI server (400 of FIG. 34). The learning processor unit (140*c*) may process information received from an external device through the communication unit (110) and/or information stored in the memory unit (130). In addition, an output value of the learning processor unit (140*c*) may be transmitted to the external device through the communication unit (110) and may be stored in the memory unit (130).

The invention claimed is:

1. A method comprising:

receiving a synchronization signal block (SSB) including a master information block (MIB);

receiving a first system information block (SIB) based on the MIB;

transmitting a request of system information to a base station;

receiving a second SIB from the base station based on the request of the system information;

transmitting user equipment (UE) capability information to the base station based on the second SIB;

receiving downlink control information (DCI) from the base station;

receiving learning data based on the DCI;

transmitting, based on a learning data reception condition being satisfied, learning data request information to the base station; and receiving, from the base station, the learning data based on the base station receiving the learning data request information, wherein information included in the DCI is related to transmission of the learning data, and the learning data is generated based on a communication environment of a UE, wherein training on a receiver model is performed based on the learning data and default receiver model, and wherein the learning data reception condition is satisfied, based on a first condition that the trained receiver model is not present in association with a communication environment entered by the UE, a second condition that there is no learning performed based on previously received learning data, and a third condition that the UE is being charged or a remaining battery level of the UE is greater than or equal to a preset threshold being all satisfied.

2. The method of claim 1, wherein the second SIB includes information related to the training on the receiver model, and the UE capability information includes training capability of the UE.

3. The method of claim 1, wherein the learning data request information is transmitted based on radio resource control (RRC) signaling or medium access control (MAC) signaling.

4. The method of claim 1, wherein the learning data request information indicates a minimum time interval between transmission of the learning data, a statistical distribution of a period in which the base station transmits the learning data, and learning data transmission resource.

5. The method of claim 4, wherein the learning data is transmitted through the learning data transmission resource, wherein the learning data transmission resource is allocated based on a uniform distribution in a frequency domain, and wherein the learning data transmission resource has the minimum time interval and the statistical distribution in a time domain.

6. The method of claim 1, wherein the learning data is randomized and transmitted based on at least one of an identifier (ID) of the UE or information on a cell accessed by the UE.

7. The method of claim 6, wherein the identifier is an IMSI (International Mobile Subscriber Identity) or an IMEI (International Mobile Equipment Identity), and the information on the cell is an identifier (ID) of the cell.

8. The method of claim 1, wherein the training is performed on demodulation of the receiver model.

9. The method of claim 8, wherein the training is performed based on a loss function.

10. The method of claim 9, wherein the loss function is determined by adding cross entropy to a product of a weight and a bit error rate (BER).

11. The method of claim 10, wherein the cross entropy is a difference between an estimated value of the learning data and a correct answer (label) value of the learning data, and wherein the BER is determined based on a result of channel-decoding the learning data.

12. A user equipment (UE) comprising:

one or more memories configured to store instructions;

one or more transceivers; and one or more processors configured to connect the one or more memories and the one or more transceivers, wherein the one or more processors execute instructions to:

receive a synchronization signal block (SSB) including a master information block (MIB);

receive a first system information block (SIB) based on the MIB;

transmit a request of system information to a base station;

receive a second SIB from the base station based on the request of the system information;

transmit UE capability information to the base station based on the second SIB;

receive downlink control information (DCI) from the base station; receive learning data based on the DCI;

transmit, based on a learning data reception condition being satisfied, learning data request information to the base station; and receive, from the base station, the learning data based on the base station receiving the learning data request information, wherein information included in the DCI is related to transmission of the learning data, and the learning data is generated based on a communication environment of the UE, wherein training on a receiver model is performed based on the learning data and default receiver model, and wherein the learning data reception condition is satisfied, based on a first condition that the trained receiver model is not present in association with a communication environment entered by the UE, a second condition that there is no learning performed based on previously received learning data, and a third condition that the UE is being charged or a remaining battery level of the UE is greater than or equal to a preset threshold being all satisfied.

13. A method of receiving a signal performed by a base station in a wireless communication system, the method comprising:

transmitting a synchronization signal block (SSB) including a master information block (MIB);

transmitting a first system information block (SIB) based on the MIB;

receiving a request of system information from a user equipment (UE);

transmitting a second SIB to the UE based on the request of the system information;

receiving UE capability information from the UE based on the second SIB;

transmitting downlink control information (DCI) to the UE;

transmitting, to the UE, learning data based on the DCI;

receiving, based on a learning data reception condition being satisfied, learning data request information from the UE; and transmitting, to the UE, the learning data based on receiving the learning data request information, wherein information included in the DCI is related to transmission of the learning data, and the learning data is generated based on a communication environment of the UE, wherein training on a receiver model is performed based on the learning data and default receiver model, and wherein the learning data reception condition is satisfied, based on a first condition that the trained receiver model is not present in association with a communication environment entered by the UE, a second condition that there is no learning performed based on previously received learning data, and a third condition that the UE is being charged or a remaining battery level of the UE is greater than or equal to a preset threshold being all satisfied.

\* \* \* \* \*